(12) United States Patent
Takabu

(10) Patent No.: US 12,454,066 B2
(45) Date of Patent: Oct. 28, 2025

(54) ROBOT HAND AND ROBOT CONFIGURED WITH LOOP-LIKE WIRE RODS

(71) Applicant: KABUSHIKI KAISYA LEBEN, Yokohama (JP)

(72) Inventor: Atsushi Takabu, Yokohama (JP)

(73) Assignee: KABUSHIKI KAISYA LEBEN, Yokohama (JP)

( * ) Notice: Subject to any disclaimer, the term of this patent is extended or adjusted under 35 U.S.C. 154(b) by 1001 days.

(21) Appl. No.: 17/615,660

(22) PCT Filed: Dec. 28, 2020

(86) PCT No.: PCT/JP2020/049069
§ 371 (c)(1),
(2) Date: Dec. 1, 2021

(87) PCT Pub. No.: WO2021/199544
PCT Pub. Date: Oct. 7, 2021

(65) Prior Publication Data
US 2022/0227010 A1  Jul. 21, 2022

(30) Foreign Application Priority Data

Mar. 31, 2020  (JP) .................. 2020-063296

(51) Int. Cl.
*B25J 15/10* (2006.01)
*B25J 15/12* (2006.01)
(52) U.S. Cl.
CPC .............. *B25J 15/12* (2013.01); *B25J 15/10* (2013.01)

(58) Field of Classification Search
CPC ........ B25J 15/12; B25J 15/10; B25J 15/0009; B25J 15/0028
(Continued)

(56) References Cited

U.S. PATENT DOCUMENTS 7,654,595 B2 *   2/2010   Yokoyama ............... B25J 9/142
                                                          294/99.1
7,971,496 B2 *   7/2011   Ehrenleitner .......... B25J 9/1623
                                                          73/862.636
(Continued)

FOREIGN PATENT DOCUMENTS

JP   2004-268147 A   9/2004
JP   2005-161413 A   6/2005
(Continued)

*Primary Examiner* — Paul T Chin
(74) *Attorney, Agent, or Firm* — Muncy, Geissler, Olds & Lowe, P.C.

(57) ABSTRACT

Provided is a robot hand that has a simple structure, can be used in a versatile way, changes shape depending on a physical object, and is less likely to damage the physical object. A robot hand that includes two or more finger portions making contact with a physical object and grips the physical object between the finger portions, wherein a gripping direction is nearly orthogonal to an extension direction of the finger portion and an outer shape of at least one phalanx portion is formed of a wire rod group configured with a plurality of loop-like wire rods having elasticity and arranged at predetermined intervals, and, wherein, in the wire rod group, the wire rods are arranged such that a loop shape extends in the extension direction of the finger portion and have an opening, which extends in the extension direction of the finger portion, between the wire rods.

10 Claims, 22 Drawing Sheets

(58) Field of Classification Search
USPC .................................................. 294/86.4, 213
See application file for complete search history.

(56) References Cited

U.S. PATENT DOCUMENTS

| | | | |
|---|---|---|---|
| 8,936,289 B1 * | 1/2015 | Kozlowski | ........... B25J 19/0091 |
| | | | 901/45 |
| 2009/0133524 A1 | 5/2009 | Fukano | |
| 2013/0109005 A1 | 5/2013 | Hardy | |
| 2013/0154294 A1 | 6/2013 | Shiomi | |
| 2015/0174500 A1 | 6/2015 | Beglan | |

FOREIGN PATENT DOCUMENTS

| | | |
|---|---|---|
| JP | 2009-125851 A | 6/2009 |
| JP | 2011-218448 A | 11/2011 |
| JP | 2013-123785 A | 6/2013 |
| JP | 2014-532519 A | 12/2014 |
| JP | 3198663 U | 7/2015 |
| JP | 2019-5513 A | 1/2019 |
| WO | 2020/166335 A1 | 8/2020 |

* cited by examiner

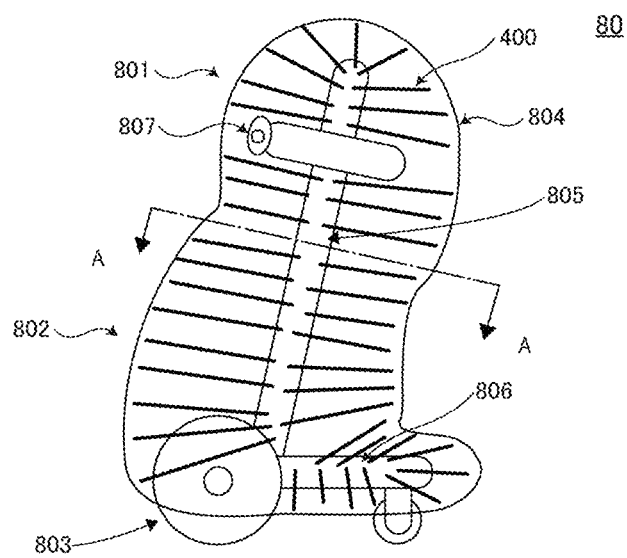
Fig. 25
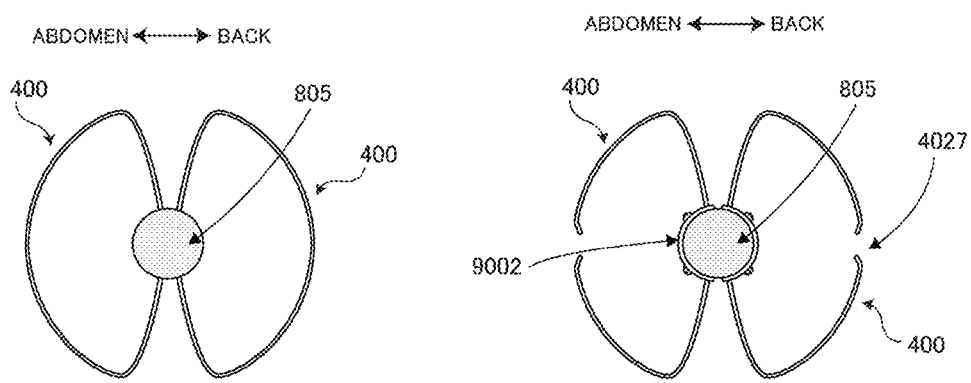
Fig. 26A
Fig. 26B

ROBOT HAND AND ROBOT CONFIGURED WITH LOOP-LIKE WIRE RODS

TECHNICAL FIELD

The present invention relates to a robot hand and a robot. The present invention claims priority to Japanese Patent Application No. 2020-063296, filed Mar. 31, 2020, and, in designated states where incorporation by literature reference is allowed, the contents of this application are incorporated herein by reference in their entirety.

BACKGROUND ART

A gripper mechanism provided with a drive mechanism, for example, is proposed as an apparatus that grips a physical object (see PTL 1). This gripper mechanism includes, as a pressing member, a gripper portion with one set of holding members that hold a workpiece by opening and closing by getting close to each other and separating from each other in synchronization with displacement of a displacement member (see claim 3). Moreover, there is a humanoid robot with a body or the like whose outer side is formed of a frame such as a casting (see Cited Literature 2). Furthermore, there is what is called a pet robot or companion robot whose outer shape is formed of a resin frame.

CITATION LIST

Patent Literature

PTL 1: JP-A-2009-125851
PTL 2: JP-A-2005-161413

SUMMARY OF INVENTION

Technical Problem

The above-mentioned gripper mechanism described in PTL 1 sometimes cannot hold physical objects in a versatile way depending on the shapes or sizes of the physical objects. Moreover, the gripper mechanism may damage a physical object if the physical object is soft. Although the above-mentioned humanoid robot described in PTL 2 can make the outer frame of the body lighter than the existing one and can provide detachability and stiffness, the humanoid robot has a complicated structure, which results in high cost. In what is called the pet robot or companion robot mentioned above, the resin frame forming the outer shape may be broken when it is subjected to an impact.

One aspect of the present invention solves at least one of the above-mentioned problems and an object thereof is to provide a robot hand that can be used in a versatile way, changes shape depending on a physical object, and is less likely to damage the physical object. Moreover, one aspect of the present invention solves at least one of the above-mentioned problems and an object thereof is to provide a robot that allows the outer shapes of a head portion, an upper limb portion, a torso portion, a lower limb portion and so forth to be formed such that they are lightweight and inexpensive, and can protect itself from an impact.

Solution to Problem

To solve the at least one problem described above, a robot hand according to the present invention is a robot hand that includes two or more finger portions making contact with a physical object and grips the physical object between the finger portions, wherein a gripping direction is nearly orthogonal to an extension direction of the finger portion and an outer shape of at least one phalanx portion is formed of a wire rod group configured with a plurality of loop-like wire rods having elasticity and arranged at predetermined intervals, and, wherein, in the wire rod group, the wire rods are arranged such that a loop shape extends in the extension direction of the finger portion and have an opening, which extends in the extension direction of the finger portion, between the wire rods.

Moreover, to solve the at least one problem described above, a robot according to the present invention includes the above-mentioned robot hand.

Furthermore, to solve the at least one problem described above, a robot according to the present invention is a robot that includes at least a torso portion and is able to move, wherein the torso portion includes a backbone member and an outer shape of the torso portion is formed of a loop-like wire rod having elasticity and provided in a prescribed manner so as to surround the backbone member.

Advantageous Effects of Invention

According to one aspect of the present invention, it is possible to provide a robot hand and a robot that can be used in a versatile way, change shape depending on a physical object, and are less likely to damage the physical object. According to one aspect of the present invention, it is possible to provide a robot that allows the outer shapes of a head portion, an upper limb portion, a torso portion, a lower limb portion and so forth to be formed such that they are lightweight and inexpensive, and can protect itself from an impact.

Any problems, configurations, and advantageous effects other than those mentioned above will be clearly understood from the following description of an embodiment.

BRIEF DESCRIPTION OF DRAWINGS

FIG. 25 is a diagram showing one example of a robot according to one embodiment of the present invention.

FIG. 26A is one example of an AA-line end view of FIG. 25 and FIG. 26B is another example of the AA-line end view of FIG. 25.

DESCRIPTION OF EMBODIMENTS

Hereinafter, examples of embodiments of the present invention will be described using the drawings. It is to be noted that a common component element in the following embodiments is denoted by the same reference sign as the previously used reference sign and an explanation of the component element is sometimes omitted. Moreover, when the shapes, positional relationship and so forth of the component elements and the like are mentioned, it is assumed that the shapes and so forth include, for example, what virtually resembles them or is virtually similar to them except, for example, when specified otherwise and when it is considered that in principle the shapes and so forth do not obviously include, for example, what virtually resembles them or is virtually similar to them.

<Robot Hand>

Figure 1:
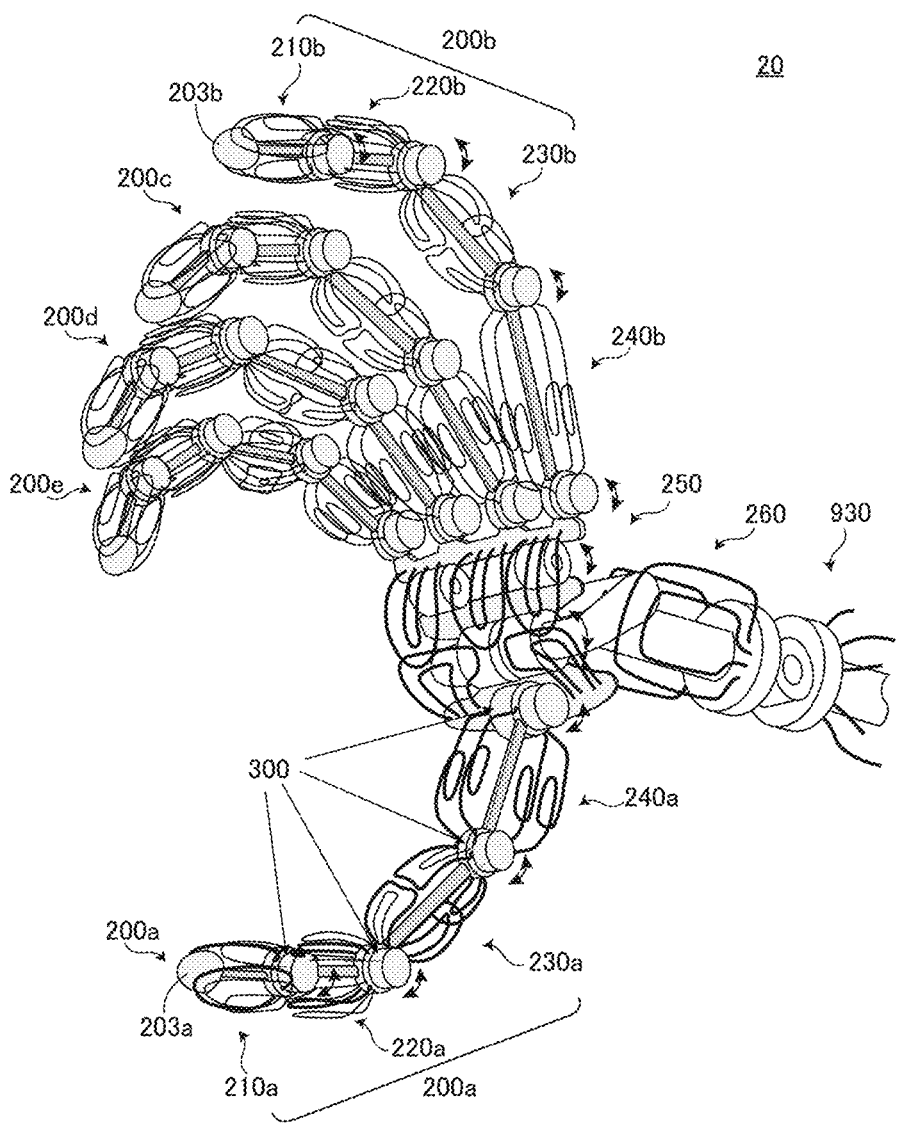
FIG. 1 is a diagram showing one example of a robot hand according to one embodiment of the present invention.

FIG. 1 is a diagram showing one example of a robot hand according to one embodiment of the present invention. In this example, a robot includes an industrial robot (a robot manipulator, a robot arm) and a non-industrial robot (a service robot). In the present embodiment, a description will be given mainly taking a humanoid robot as an example; the present embodiment can also be applied to other robots.

A robot hand (hereinafter also abbreviated as a "hand") 20 is attached to a tip portion of a forearm portion 930 of the robot and grips a physical object between finger portions. The hand 20 includes two or more finger portions (in this example, finger portions 200a, 200b, 200c, and 200d), root base portions (in this example, root base portions 240a, 240b, 240c, and 240d) corresponding to the two or more finger portions, a hand base portion 250 connecting to the root base portions, and an attachment portion 260 that attaches the hand to a tip portion of the robot. In the following description, a side of the hand 20 where the physical object is gripped is assumed to be a ventral side and an opposite side is assumed to be a dorsal side. A dorsal-ventral direction (a gripping direction) is nearly orthogonal to an extension direction of the finger portion. Moreover, in the hand 20, a direction orthogonal to an extension direction (a front-back direction) of a finger and the dorsal-ventral direction (the gripping direction) is assumed to be a left-right direction.

The two or more finger portions are divided into two sets and placed. As one example, as shown in the drawing, one set including the first finger portion 200a and the other set including the second finger portion 200b, the third finger portion 200c, the fourth finger portion 200d, and the fifth finger portion 200e are placed so as to face each other. One of the first finger portion 200a of the one set and at least one finger portion of the other set gets close to the other and separates from the other or the first finger portion 200a of the one set and at least one finger portion of the other set get close to each other and separate from each other, whereby the hand 20 is opened and closed and grips the physical object. The number of finger portions can be set as appropriate; the number of finger portions of one set may be two or more and the number of finger portions of the other set may be four or less.

The first finger portion 200a includes three phalanx portions: a first phalanx portion 210a, a second phalanx portion 220a, and a third phalanx portion 230a (the same goes for the second finger portion 200b and the like). The root base portion 240a extends in the same direction as an extension direction of the phalanx portion and connects to the third phalanx portion 230a via a joint portion which will be described later (the same goes for the root base portion 240b and the like). An extension direction of the hand base portion 250 is nearly orthogonal to an extension direction of the root base portion, and the hand base portion 250 connects to each root base portion 240 via a joint portion which will be described later.

A description will be given taking the second finger portion 200b in the hand 20 as an example; the phalanx portions (210b, 220b, and 230b) correspond to finger bones of a human hand and surrounding tissues thereof, the root base portion 240b corresponds to a metacarpus and a surrounding tissue thereof, and the hand base portion 250*b* corresponds to a carpal bone and a tissue surrounding it. The hand 20 may be provided with a nail-at-the-tip 203*b*, like a nail, at the tip of the phalanx portion 210*b*. As one example, the nail-at-the-tip 203*b* is formed of silicone resin or the like, for example, in the form of a block.

The hand 20 includes joint portions 300 as connecting portions that connect the phalanx portions, connect the phalanx portion and the root base portion, and connect the root base portion and the hand base portion. As one example, the joint portions 300 can rotate in an arrow direction shown in the drawing, which causes the above-mentioned phalanx portions and the like to rotate and the hand 20 to bend and stretch and thereby grip or grasp an object. A conventional technology may be used as appropriate in the configuration of the joint portion without departing from the spirit of the present invention.

As one example, to drive the joint portions in the hand 20, a tendon drive mechanism (a wire drive mechanism, a cable drive mechanism) that drives (for example, pulls) the joint portions by tendon members such as wires is used. The tendon drive mechanism may be a mechanism that drives (for example, pulls) the tendon members from one side or may be a mechanism that drives the tendon members from both sides. Moreover, the tendon drive mechanism may be a mechanism that drives the tendon members in an interlocked manner. As another example, the joint portions in the hand 20 are driven by a motor (for example, a servomotor, a stepping motor, or a combination of a motor and a gear).

<Finger Portion of the Robot Hand>

Figure 2:
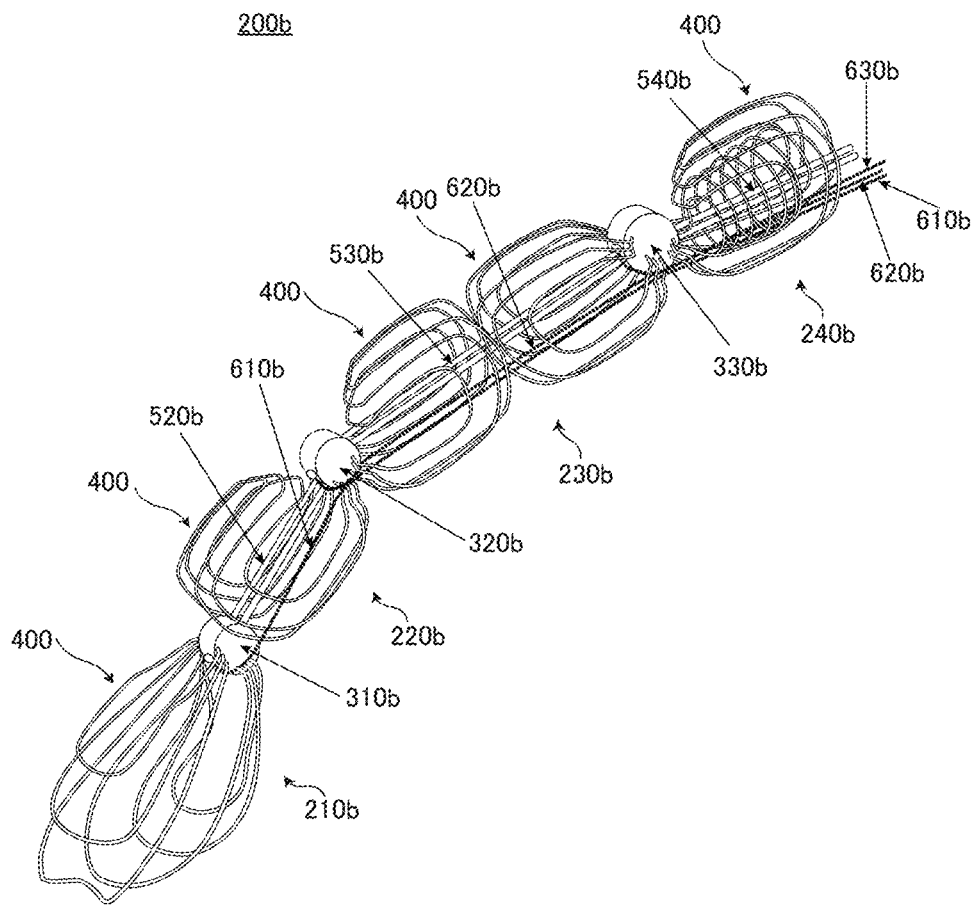
FIG. 2 is a diagram showing one example of a finger portion of the robot hand according to the embodiment of the present invention.

FIG. 2 is a diagram showing one example of the finger portion of the robot hand according to the embodiment of the present invention. As one example, the finger portion shown in the drawing is used in the hand 20 shown in FIG. 1. As one example, the finger portion shown in the drawing may be used in a robot hand other than a humanoid robot hand like that shown in FIG. 1. The following description is given as one example of the second finger portion 200*b* of the hand 20 (the other finger portions of the hand 20 can be configured in a similar manner).

As shown in FIG. 2, the finger portion 200*b* includes a finger bone member. More specifically, the finger portion 200*b* includes a second finger bone member 520*b* that connects to a first finger joint portion 310*b* at a front end and connects to a second finger joint portion 320*b* at a rear end and a third finger bone member 530*b* that connects to the second finger joint portion 320*b* at a front end and connects to a third finger joint portion 330*b* at a rear end. As shown in FIG. 1, the finger portion 200*b* may include a first finger bone member that connects to the nail-at-the-tip 203*b* at a front end and connects to the first finger joint portion 310*b* at a rear end.

A thick wire or plate material having a spring property, steel having no spring property, or the like is used as the finger bone member. For example, the lower limit of the thickness (in a polygon, a distance between opposite sides) of the finger bone member is 1.5 mm, preferably 1.6 mm, and more preferably 1.8 mm; the upper limit is 10 mm, preferably 8.0 mm, and more preferably 6.0 mm. It is to be noted that the finger bone member shown in the drawing is configured with two wires; the finger bone member may be configured with one wire or three or more wires.

The first finger joint portion 310*b*, the second finger joint portion 320*b*, and the third finger joint portion 330*b* each have a roughly cylindrical outer shape, and the axial direction thereof is orthogonal to the extension direction of the finger portion.

As one example, each finger joint portion has a shaft portion and a bearing and the phalanx portion rotates about the shaft portion with the rotation of the shaft portion, which allows the finger portion to bend and stretch.

As one example, a front end of a first finger tendon member 610*b* is fixed to a front end of the first finger joint portion 310*b*, a front end of a second finger tendon member 620*b* is fixed to a front end of the second finger joint portion 320*b*, and a front end of a third finger tendon member 630*b* is fixed to a front end of the third finger joint portion 330*b*. Each shaft portion rotates in a direction in which each finger tendon member is pulled, which causes the finger portion to bend and stretch. Preferably, an unillustrated return mechanism such as a spring is provided in each joint portion so that the phalanx portion can return to an initial state after bending and stretching, which allows the phalanx portion to return to the initial state when the tendon member is loosened.

As one example, each finger bone member has a spring property, such that, when the finger tendon member is pulled, the finger bone member bends in a direction in which the finger tendon member is pulled and the finger bone member returns to the original state when the finger tendon member is loosened. A simple structure may be adopted in which the shaft portion does not rotate and each finger bone member has a spring property and the finger bone member changes shape when the finger tendon member is pulled, which causes the phalanx portion to bend and stretch.

That is, at least part of the aforementioned finger joint portion may be configured as a simple connecting portion with no bending and stretching capability. Moreover, no finger joint portion with a bending and stretching capability may be provided between the phalanx portions and the joint portion may be provided only between the third phalanx portion and the root base portion. In this case, the finger bone member of the phalanx portion located beyond the third phalanx portion may have a concave shape curved toward the ventral side and a wire rod group, which will be described later, surrounding that finger bone member may also have a shape appropriate to the curved shape.

The finger portion 200*b* includes a plurality of wire rods 400 ("first wire rods") forming the outer shape thereof. The wire rod 400 is a metal wire rod that has elasticity and is preferably circular in cross section, for example, a wire such as a stainless steel wire, a piano wire, a brass wire, a noble metal wire, a noble metal plated wire, or a titanium wire. It is to be noted that the wire rod 400 is not limited thereto; a wire rod that is quadrilateral, hexagonal, or the like in cross section may be used. For example, the lower limit of the thickness (in a polygon, a distance between opposite sides) of the wire rod is 0.2 mm, preferably 0.25 mm, and more preferably 0.3 mm; the upper limit is 5.0 mm, preferably 4.0 mm, and more preferably 3.2 mm.

The wire rod 400 may be the aforementioned wire rod having a covering layer on the surface thereof as a result of it being covered with nylon, silicone, or Teflon or as a result of plating or the like being applied thereto. Furthermore, the wire rod 400 may be formed of a material such as plastic resins (including plastic resins containing carbon fibers, Kevlar®, or the like) such as nylon. Moreover, the wire rod 400 may be a stranded wire, a wire having a structure in which a metal wire or the like is wound around a wire or a bundle of wires (for example, like a string of a guitar), or the like. In addition, the wire rod 400 may be configured so as to be thick at both ends and to have a thickness gradually decreasing toward a central part. It is to be noted that, even when the "wire" and the "wire rod" are mentioned in the following description, this does not intend to limit them to a wire and they can be any publicly known preferred elastic wire rods. Furthermore, an antislip member or a protector may be formed thereon using rubber, a plastic resin, or the like.

The wire rod 400 has a loop shape. More specifically, this shape is a shape obtained by bending one wire rod roughly in the center thereof such that one end (an end) at a starting point and the other end (an end) are aligned. In this example, a loop has an unclosed loop shape, for example, a shape like a letter U, C, or the like. In the robot hand, the outer shape of at least one phalanx portion of the finger portion is formed of a wire rod group configured with the loop-like wire rods 400 having elasticity which are arranged at predetermined intervals. In other words, the outer shape of at least one phalanx portion is formed of wires, or an outer shell, a surface layer portion, and a skin of at least one phalanx portion are formed of wires. As one example, as shown in the drawing, the finger portion includes two or more phalanx portions and wire rod groups in the two or more phalanx portions are different from each other. Preferably, in each wire rod group, the wire rods 400 are arranged such that the loop shape extends in the extension direction of the finger portion and have an opening, which extends in the extension direction of the finger portion, between the wire rods 400. Preferably, the wire rod group is configured so as to have a convex shape projecting toward at least one of the dorsal side, the ventral side, the left side, and the right side.

<Wire Rod Group (First-Type Wire Rod Group) of the Finger Portion>

Figure 3:
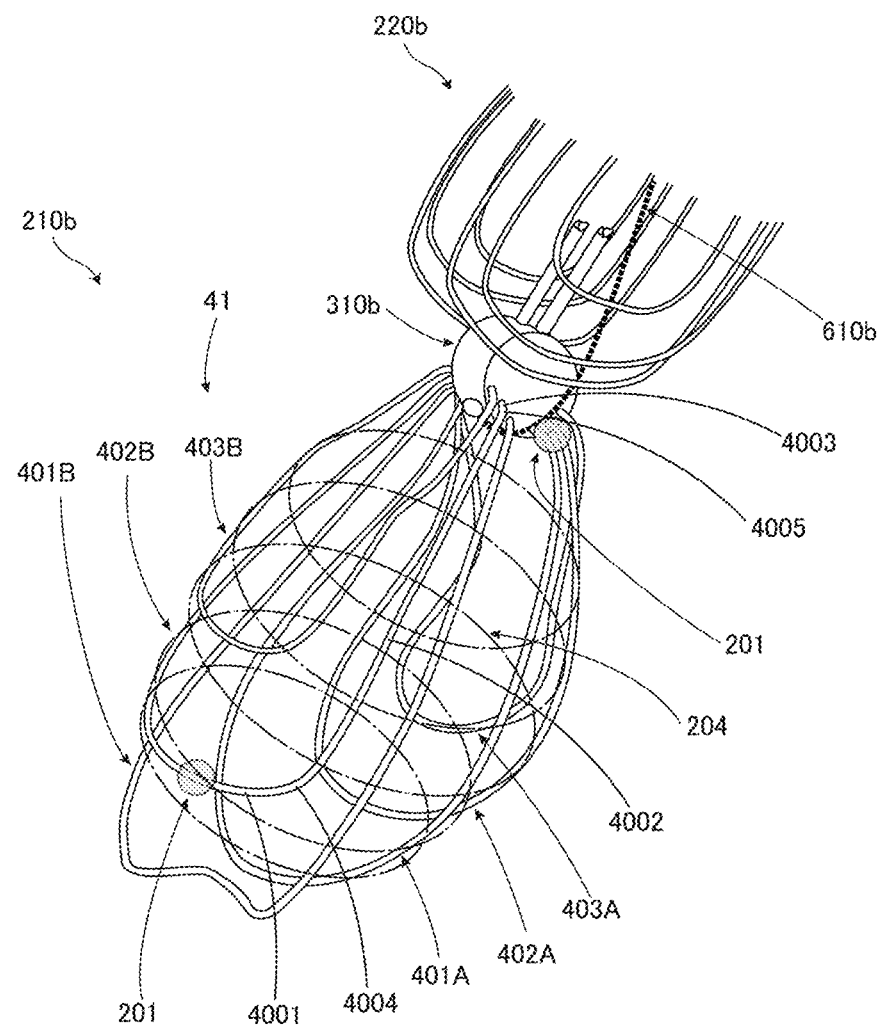
FIG. 3 is a diagram showing the example of the finger portion of the robot hand according to the embodiment of the present invention and is a partially enlarged view of the finger portion of FIG. 2.
Figure 4:
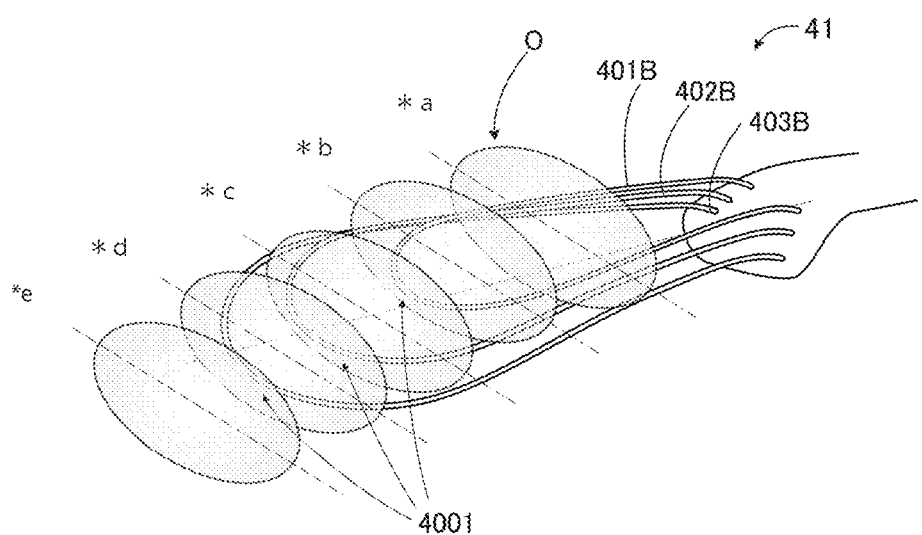
FIG. 4 is a schematic diagram for explaining a wire rod group of the finger portion.
Figure 5:
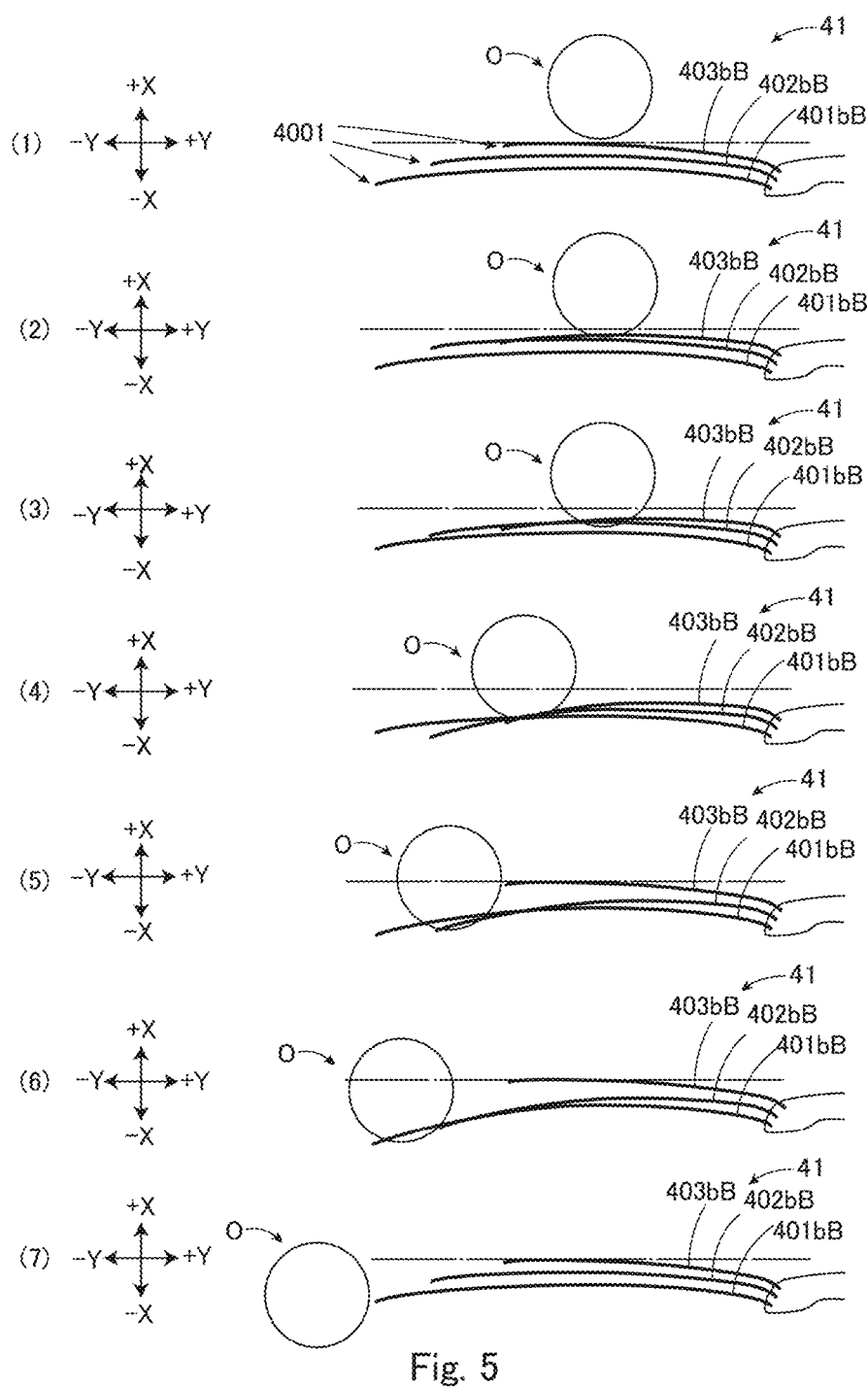
FIG. 5 is a schematic diagram for explaining the wire rod group of the finger portion.
Figure 6:
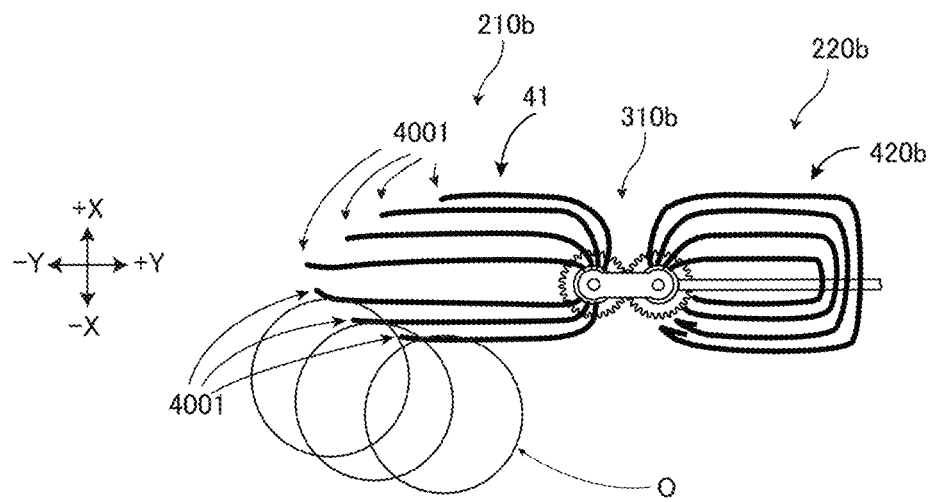
FIG. 6 is a schematic diagram for explaining the wire rod group of the finger portion.
Figure 7A:
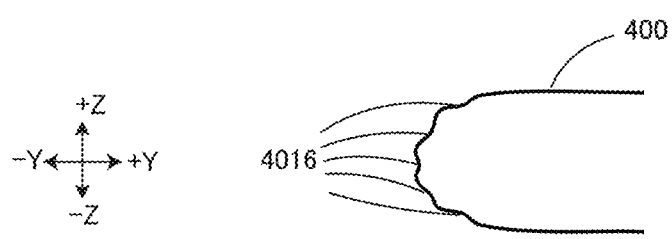
FIG. 7A is a diagram showing another example of a wire rod of the finger portion and FIG. 7B is a diagram showing another example of the wire rod of the finger portion.
Figure 7B:
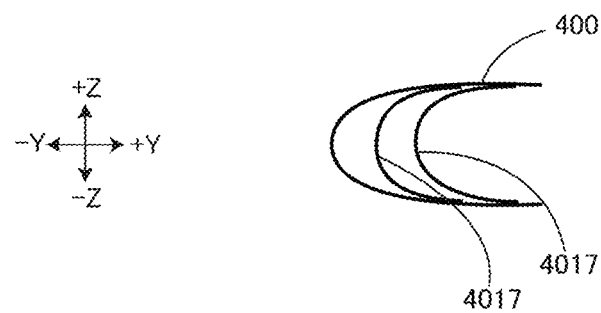

FIG. 3 is a diagram showing one example of the finger portion of the robot hand according to the embodiment of the present invention and is a partially enlarged view of FIG. 2. FIGS. 4 to 6 are schematic diagrams for explaining the wire rod group of the finger portion. FIGS. 7A and 7B are diagrams, each showing another example of the wire rod.

As shown in FIG. 3, the outer shape of the first phalanx portion 210b is formed of a wire rod group 41. The wire rod group 41 includes the loop-like wire rods 400 having elasticity, and at least part thereof can bend. As one example, the wire rod group 41 is a first-type wire rod group configured with two sets of wire rods: one set (a first set) of three wire rods including a wire rod 401A, a wire rod 402A, and a wire rod 403A which differ in the length of the wire rod or the size of the loop and the other set (a second set) including a wire rod 401B, a wire rod 402B, and a wire rod 403B which differ in the length of the wire rod or the size of the loop, the two sets of wire rods facing each other on the ventral side and the dorsal side. The wire rods in the first set and the second set have an opening, which is greater than or equal to the wire diameter of the wire rod (the thickness or width of the wire rod), between the wire rods. Both ends of each wire rod are received by the joint portion 310b and fixed thereto. The configuration of a wire rod retaining portion (the wire rod fixation structure) that fixes the wire rod is not limited to a particular configuration, and a publicly known technology may be used as appropriate.

Each wire rod of the wire rod group 41 has a loop shape which is a shape like a letter U or a shape like a letter C. Each wire rod is a continuous wire rod and includes a tip 4001 which is a central part, a base end 4003 which is a portion extending from the joint portion, and a limb 4002 extending between the tip 4001 and the base end 4003. In other words, both base ends 4003 extending from the joint portion transition to both limbs 4002 and the tip 4001 transitions to the limbs 4002 on the right and left sides. When the wire rod has a shape like a letter U, corner portions 4004 (first corner portions) are formed in portions where transition from the tip 4001 to both limbs 4002 occurs. Moreover, corner portions 4005 (second corner portions) may be formed in portions where transition from the base ends 4003 to both limbs 4002 occurs. Both ends of each wire rod of the wire rod group are fixed to the joint portion (the connecting portion) in such a way that tail ends are not exposed. The base end 4003 is the end excluding the tail end and is a portion exposed from the joint portion (the connecting portion), and is a portion closer to the central part than the tail end.

The wire rods of the first set (on the ventral side) of the two sets are placed, from the dorsal side to the ventral side, in the order of the largest wire rod 401A with the largest loop, the second largest wire rod 402A with the second largest loop, and the smallest wire rod 403A with the smallest loop, and the first set is convex toward the ventral side and concave with respect to the other set and has an internal space. The second set (on the dorsal side) is placed so as to have a symmetrical relationship with the first set, the wire rods of the second set are placed, from the ventral side to the dorsal side, in the order of the largest wire rod 401B with the largest loop, the second largest wire rod 402B with the second largest loop, and the smallest wire rod 403B with the smallest loop, and the second set is convex toward the dorsal side and concave with respect to the other set and has an internal space. Preferably, each wire rod of the wire rod group 41 is configured such that almost the entirety of the shape of a letter U or the shape of a letter C is included in a plane orthogonal to the dorsal-ventral direction. The wire rod group 41 has the shape of a cylinder (more specifically, for example, a shape like a circular cylinder or elliptical cylinder whose cross-sectional area is large at the center and is gradually reduced toward the front and rear ends) and is three-dimensionally configured.

Being configured in this manner, the wire rod group 41 has a convex shape that is convex toward the dorsal, ventral, left, and right sides. In other words, a convex surface is configured, on the ventral side, with both limbs 4002 and the tips 4001 of the wire rods 401A, 402A, and 403A, a convex surface is configured, on the dorsal side, with both limbs 4002 and the tips 4001 of the wire rods 401B, 402B, and 403B, a convex surface is configured, on the left side and the right side, with one of the limbs of 401A, one of the limbs of 402A, and one of the limbs of 403A and one of the limbs of 401B, one of the limbs of 402B, and one of the limbs of 403B, respectively, and these convex surfaces have a common interior space. In other words, as indicated by imaginary lines shown in the drawing, the first phalanx portion 210b includes a roughly cylindrical frame 204 formed of the wire rod group 41. The phalanx portions of the present embodiment can bend when pressed from all directions: 360 degrees, and can reduce an impact and grip an object in cooperation with one another.

Preferably, a displacement sensor 201 is provided in the first phalanx portion 210. The displacement sensor 201 is attached to some of the wire rods of the wire rod group 410b and is attached to the base end or tip of a loop, for example. As one example, the displacement sensor 201 is a strain gage, for example. As another example, the displacement sensor 201 is a mechanical sensor, for example. As shown in the drawing, two or more sensors may be attached in multiple places such as the tip and the base end. The movement of the wire rods is detected by the displacement sensor and the motion of the phalanx portion can be controlled based on the detected value. Alternatively, the displacement sensor may be, for example, a distortion sensor that detects distortion of a wire, a pressure sensor that detects pressure that is applied when a wire touches an object, an acceleration sensor that detects fluctuations, or a gyro sensor that detects a tilt or the like. The displacement sensor may be an infrared sensor or a distance sensor that detects an approaching object.

More specifically, the displacement sensor is, for example, a sensor that detects a bend or kink in a wire rod. For example, a pressure-sensitive sensor with a resistance value that varies in response to the pressure applied thereto can be used. The displacement sensor can be formed in the form of a fiber and provided so as to be integral with a wire rod. The displacement sensor may be provided in a loop-like wire rod along its entire length or provided in a region (for example, a basal portion, a central part, or the like) where a bend tends to occur or a region (such as a fingertip or an outer side) where contact with an external object tends to occur. A plurality of displacement sensors may be placed on one wire rod so that displacement in each region can be detected. The displacement sensor may be a displacement sensor using light (such as laser) and detecting displacement of the position of a wire rod.

The softness, weight, angle and so forth of a physical object are detected using a sensor, which allows a control portion (a built-in microcontroller, a control PC for remote control, or the like) to control the motion of the robot hand such that the robot hand moves in accordance with the physical object. For example, it is possible to stop the robot hand, change the orientation thereof, move the robot hand in a different direction, catch the physical object, and hold the physical object in the palm thereof.

One example of the dorsal side is shown in FIG. 4. When a clumpy object (a physical object) O touches the phalanx portion, first, the closest wire rod (the smallest wire rod) 403B closest to the object O bends under a load. Next, the second closest wire rod (the second largest wire rod) 402B second closest to the object O bends under a load. Then, the farthest wire rod (the largest wire rod) 401B farthest from the object O bends under a load. As indicated by a, b, c, d, and e shown in the drawing, the wire rods under a load in the phalanx portion sequentially increase in number or change places. The tip 4001 of a loop (in the shape of a letter U or the shape of a letter C) of each wire rod is a support portion that holds the object O and supports a load.

In FIG. 5, one example of the flow from a touch of the object O on the wire rod group to separation therefrom will be described taking the second set (the wire rods 401B, 402B, and 403B) on the dorsal side as an example. In the drawing, +X and −X indicate the dorsal-ventral direction (the gripping direction) and −Y and +Y indicate the front-back direction (the extension direction of the finger portion) (the same goes for the other drawings). The wire rods are arranged such that the loop shape extends in the extension direction of the finger portion and have an opening, which extends in the extension direction of the finger portion, between the wire rods.

(1) In a state in which, although the object O is approaching the wire rod group, the object O does not touch the wire rod group yet, the smallest wire rod 403B is located in a position closest to the object O (is closest to the object O), the largest wire rod 401B is located in a position farthest from the object O (is farthest from the object O), and the second largest wire rod 402B is located between the smallest wire rod 403B and the largest wire rod 401B. The three wire rods are placed so as to have an opening, which is greater than or equal to the wire diameter (thickness) of the wire rod extending in the extension direction of the finger portion, between the adjacent wire rods and to form layers. As one example, each wire rod is convex toward the dorsal side in a shape like an arc when viewed from the side as shown in the drawing.

(2) In a state in which the object O is approaching the wire rod group and starts to touch the wire rod group, the object O touches the limbs of the smallest wire rod (the closest wire rod) 403B first. Consequently, the smallest wire rod 403B bends toward the ventral side and approaches the second largest wire rod (the second closest wire rod) 402B adjacent thereto.

(3) In a state in which the entire load of the object O is applied to the wire rod group, the smallest wire rod 403B further bends toward the ventral side and a portion of the smallest wire rod 403B from the limbs to the tip gets into the loop of the second largest wire rod 402B. Consequently, the second largest wire rod 402B also comes into contact with the object O and the load is applied to the second largest wire rod 402B, which causes two wire rods: the smallest wire rod 403B and the second largest wire rod 402B to make contact with the object O and support it. Moreover, depending on the load of the object O, the second largest wire rod 402B also bends toward the ventral side and approaches the largest wire rod 401B adjacent thereto.

(4) The smallest wire rod 403B and the second largest wire rod 402B further bend toward the ventral side and get into the loop of the largest wire rod 401B. Consequently, the largest wire rod 401B also comes into contact with the object O and the load is applied to the largest wire rod 401B. This causes three wire rods: the smallest wire rod 403B, the second largest wire rod 402B, and the largest wire rod 401B to support the object O.

On the other hand, the object O slides forward along the limbs while being subjected to the reaction force of the wire rods. Consequently, the tip of the smallest wire rod 403B supports the object O and prevents the movement of the object O in front.

(5) When the object O gets over the tip of the smallest wire rod 403B, the tip of the second largest wire rod 402B supports the object O and prevents the movement of the object O in front, and the smallest wire rod 403B is released from the load and returns to the original state. This causes two wire rods: the second largest wire rod 402B and the largest wire rod 401B to support the object O.

(6) When the object O gets over the tip of the second largest wire rod 402B, the tip of the largest wire rod 401B supports the object O and prevents the movement of the object O in front, and the second largest wire rod 402B is released from the load. In this state, since the object O is supported only by the tip of the largest wire rod 401B, the largest wire rod 401B bends greatly.

(7) When the object O gets over the tip of the largest wire rod 401B, the largest wire rod 401B is released from the load and the object O separates from the wire rod group.

As described above, even when the wire rod group touches the object O, the wire rod group supports the load of the object O while bending until the object O separates therefrom, which makes it possible to protect the bone members, the tendon members, and the like which are placed inside. Moreover, the wire rod group makes contact with the object O gently, which allows the wire rod group to touch the object O without damaging it.

On the other hand, when the object O is gripped by the wire rod group of the phalanx portion, the object O is gripped by the first set (the wire rods 401A, 402A, and 403A) on the ventral side.

In this case, in an initial state, the wire rod groups 41 of the phalanx portions of a pair of finger portions facing each other can approach each other and switch from a state in which the closest wire rods (the smallest wire rods), each being the closest to its counterpart, are in contact with each other to a state in which the closest wire rods are in contact with each other and the second closest wire rods (the second largest wire rods), each being the second closest to its counterpart, are in contact with each other. In this case, in each wire rod group 41, the closest wire rod gets into the loop of the second closest wire rod. Furthermore, the wire rod groups 41 can switch to a state in which the closest wire rods are in contact with each other, the second closest wire rods are in contact with each other, and the farthest wire rods (the largest wire rods), each being the farthest from its counterpart, are in contact with each other. In this case, in each wire rod group 41, the closest wire rod and the second closest wire rod get into the loop of the farthest wire rod.

Moreover, in a usage state, they act as follows when gripping the physical object O.

(1) In a state in which, although the wire rod group is approaching the object O, the wire rod group does not grip the object O yet, there are the smallest wire rod (the closest wire rod) 403B, which is the closest to the object O, of the first set, the largest wire rod (the farthest wire rod) 401A farthest from the object O, and the second largest wire rod (the second closest wire rod) 402A therebetween. The three wire rods are placed so as to have an opening, which is greater than or equal to the wire diameter (thickness) of the wire rod extending in the extension direction of the finger portion, between the adjacent wire rods and to form layers. As one example, each wire rod is convex toward the ventral side in a shape like an arc when viewed from the side.

(2) When the wire rod group further approaches the object O and grips the object O, the limbs of the smallest wire rod 403A touch the object O first. Consequently, the smallest wire rod 403A grips and lifts the object O in cooperation with the smallest wire rod of the other phalanx portion while bending toward the dorsal side and approaching the adjacent second largest wire rod 402A.

(3) If the smallest wire rod 403A cannot grip and lift the object O in (2), when the smallest wire rod 403A further bends toward the dorsal side and a portion thereof from the limbs to the tip gets into the loop of the second largest wire rod 402A, the second largest wire rod 402A also comes into contact with the object O and both the smallest wire rod 403A and the second largest wire rod 402A come into contact with the object O and grip and lift the object O in cooperation with the wire rods of the other phalanx portion.

(4) If the smallest wire rod 403A and the second largest wire rod 402A cannot grip and lift the object O in (3), when the smallest wire rod 403A and the second largest wire rod 402A further bend toward the dorsal side and get into the loop of the largest wire rod 401A, the largest wire rod 401A also comes into contact with the object O and the smallest wire rod 403A, the second largest wire rod 402A, and the largest wire rod 401A grip and lift the object O in cooperation with the wire rods of the other phalanx portion.

As described above, the wire rod group can grip and lift the object O with a force appropriate to the object O by sequentially increasing the number of wire rods coming into contact with the object O while bending.

Moreover, as shown in FIG. 6, when the ventral side of the wire rod group 410b comes into contact with the object O, the tip 4001 has the function of supporting the object O and preventing the movement of the object O in front like a fingerprint of a human fingertip.

As described above, at least part of the wire rod group 41 bends, which allows the wire rod group 41 to grip and lift the object O with a force appropriate to the object O and make contact with the object O gently and provides the wire rod group 41 with an antislip effect when the wire rod group 41 grips the object O. It is to be noted that providing the wire rods, with which the wire rod group 41 is configured, with a covering layer made of a soft material as mentioned earlier allows the wire rod group 41 to make contact with the object O more gently.

Moreover, using the wire rod group to form the outer shape of the phalanx portion makes the finger portion lighter. Furthermore, the wire rod group has many openings, which reduces air resistance. In addition, the wire rod group is easily worked on and manufactured. For example, a mold for the outer shape is not necessary and it is only necessary to bend a wire. It is only necessary to manufacture the wire rod group using a wire with a smooth surface from the beginning, which makes a burr less likely to appear in a surface layer.

As shown in FIG. 7A, an antislip portion that is uneven in a wavelike fashion may be provided by providing one or more than one depression (or projection) 4016 at the loop tip of the wire rod 400. The degree of depression of the depression 4016 (the degree of projection when it is a projection) shown in the drawing is greater than the wire diameter of the wire rod 400; the degree of depression of the depression 4016 (the degree of projection when it is a projection) may be less than the wire diameter of the wire rod 400. This makes it easy to handle the object O even when it is a small object or an object of an unstable shape. It is to be noted that, in the drawing, −Z and +Z indicate the left-right direction (the same goes for the other drawings).

As shown in FIG. 7B, one or more than one strengthening portion 4017 may be provided at the loop tip of the wire rod 400. As one example, as shown in the drawing, the strengthening portion 4017 is provided behind the tip of the loop in the shape of an arc projecting forward. That is, a U-shaped wire rod is bonded, at both ends thereof, to the inside of the U-shaped wire rod 400 to obtain the strengthening portion 4017. A wire rod similar to the wire rod 400 may be used as the strengthening portion 4017. A known technique such as fixation by welding, bonding, or a fixing member may be used as appropriate to fix the strengthening portion 4017 to the wire rod 400.

These portions make it easy to handle the physical object O even when it is a small object or an object of an unstable shape. Moreover, it is possible to make elasticity near the tip higher and grip the object O more reliably by providing one wire rod with a difference in level as if increasing the density of a fingerprint.

<Wire Rod Group (Second-Type Wire Rod Group) of the Finger Portion>

Figure 8:
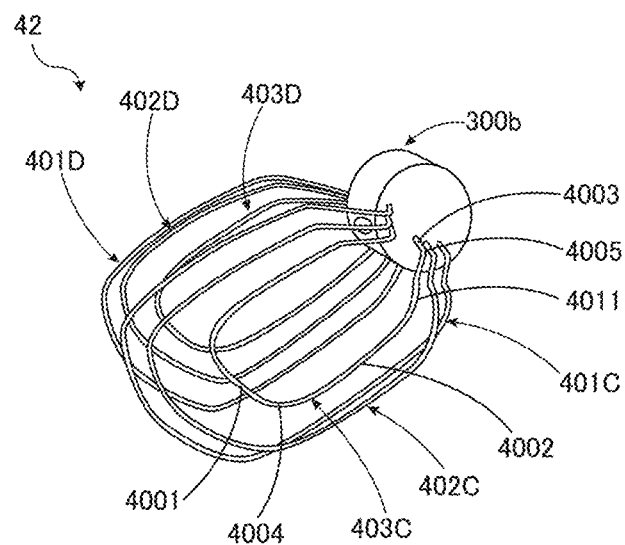
FIG. 8 is a diagram showing another example of the wire rod group of the finger portion of the robot hand according to the embodiment of the present invention.

FIG. 8 is a diagram showing another example of the wire rod group of the finger portion of the robot hand according to the embodiment of the present invention. The following description deals mainly with a difference from the aforementioned wire rod group.

In this example, a wire rod group 42 is a second-type wire rod group that is configured with a first set of three wire rods 401C, 402C, and 403C having roughly U-shaped (or C-shaped) loops of different sizes and being placed on the left side and a second set of three wire rods 401D, 402D, and 403D having U-shaped (or C-shaped) loops of different sizes and being placed on the right side and is formed in a shape like a cylinder as a whole. The three wire rods of each of the first set and the second set are placed so as to have an opening, which is greater than or equal to the wire diameter (thickness) of the wire rod extending in the extension direction of the finger portion, between the adjacent wire rods and to form layers. Preferably, each wire rod of the wire rod group 42 is configured such that almost the entirety of the shape of a letter U or the shape of a letter C is included in a plane parallel to the dorsal-ventral direction. Each wire rod of the wire rod group 42 may have a corner portion (a fifth corner portion) 4011 formed near the base end, for example, by bending the limb 4002.

The wire rod group 42 has a convex shape that is convex toward the dorsal, ventral, left, and right sides. In other words, in the wire rod group 42, a convex surface is configured, on the left side, with both limbs 4002 and the tips 4001 of the wire rods 401C, 402C, and 403C, a convex surface is configured, on the right side, with both limbs 4002 and the tips 4001 of the wire rods 401D, 402D, and 403D, a convex surface is configured, on the ventral side, with one of the limbs of the wire rod 401C, one of the limbs of the wire rod 402C, one of the limbs of the wire rod 403C, one of the limbs of the wire rod 401D, one of the limbs of the wire rod 402D, and one of the limbs of the wire rod 403D, a convex surface is configured, on the dorsal side, with the other limb of the wire rod 401C, the other limb of the wire rod 402C, the other limb of the wire rod 403C, the other limb of the wire rod 401D, the other limb of the wire rod 402D, and the other limb of the wire rod 403D, and these convex surfaces have a common interior space. This allows the phalanx portions to bend when pressed from all directions: 360 degrees and reduce an impact and grip an object in cooperation with one another.

When a physical object touches the ventral side, the wire rod group 42 allows the wire rods under a load to sequentially increase in number or change places as follows: the physical object first comes into contact with one of the limbs of the wire rod 403C and one of the limbs of the wire rod 403D, the physical object then comes into contact with one of the limbs of the wire rod 402C and one of the limbs of the wire rod 402D, and the physical object then comes into contact with one of the limbs of the wire rod 401C and one of the limbs of the wire rod 401D.

Figure 23:
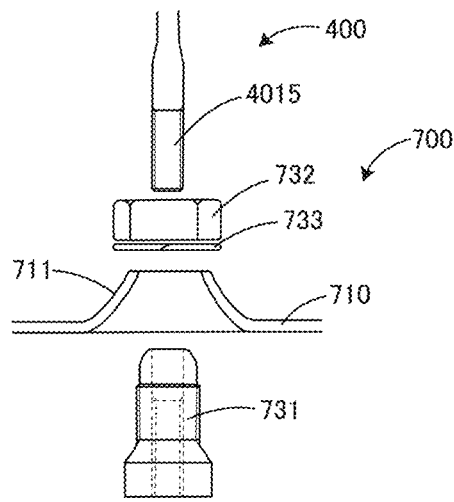
FIG. 23 is a diagram showing another example of the wire rod retaining portion of FIG. 22B.
Figure 24:
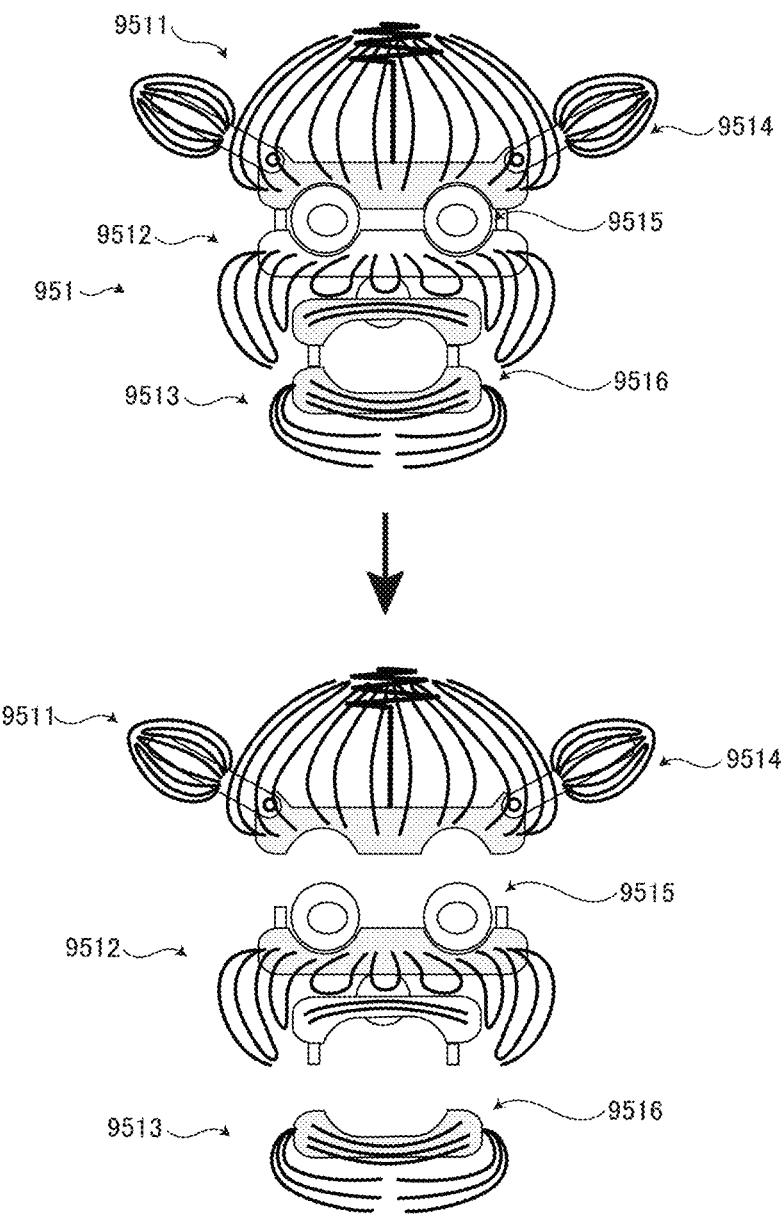
FIG. 24 is a diagram showing another example of the robot of FIG. 18.

When gripping an object, the wire rod group 42 can switch from a state in which only one of the limbs of the wire rod 403C and only one of the limbs of the wire rod 403D are in contact with the physical object on the ventral side to a state in which, along with these limbs, one of the limbs of the wire rod 402C and one of the limbs of the wire rod 402D are also in contact with the physical object and then to a state in which, along with these limbs, one of the limbs of the wire rod 401C and one of the limbs of the wire rod 401D are also in contact with the physical object (see FIGS. 23 and 24 which will be described later).

<Wire Rod Group (Third-Type Wire Rod Group) of the Finger Portion>

Figure 9:
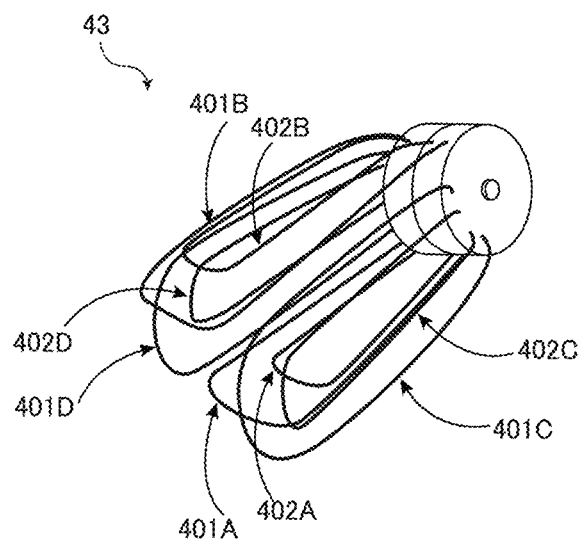
FIG. 9 is a diagram showing another example of the wire rod group of the finger portion of the robot hand according to the embodiment of the present invention.

FIG. 9 is a diagram showing another example of the wire rod group of the finger portion of the robot hand according to the embodiment of the present invention. The following description deals mainly with a difference from the aforementioned wire rod groups.

In this example, a wire rod group 43 is a third-type wire rod group that is configured with a first set of two wire rods 401A and 402A having roughly U-shaped (or C-shaped) loops of different sizes and being placed on the ventral side, a second set of two wire rods 401B and 402B having U-shaped (or C-shaped) loops of different sizes and being placed on the dorsal side, a third set of two wire rods 401C and 402C having roughly U-shaped (or C-shaped) loops of different sizes and being placed on the left side, and a fourth set of two wire rods 401D and 402D having roughly U-shaped (or C-shaped) loops of different sizes and being placed on the right side and is formed in a shape like a cylinder as a whole. The two wire rods of each of the first set, the second set, the third set, and the fourth set are placed so as to have an opening, which is greater than or equal to the wire diameter (thickness) of the wire rod extending in the extension direction of the finger portion, between the wire rods and to form layers.

The wire rod group 43 has a convex shape that is convex toward the dorsal, ventral, left, and right sides. In other words, in the wire rod group 43, a convex surface is configured, on the ventral side, with both limbs and the tips of the wire rods 401A and 402A, a convex surface is configured, on the dorsal side, with both limbs and the tips of the wire rods 401B and 402B, a convex surface is configured, on the left side, with both limbs and the tips of the wire rods 401C and 402C, a convex surface is configured, on the right side, with both limbs and the tips of the wire rods 401D and 402D, and these convex surfaces have a common interior space. This allows the phalanx portions to bend when pressed from all directions: 360 degrees and reduce an impact and grip an object in cooperation with one another.

<Wire Rod Group (Fourth-Type Wire Rod Group) of the Finger Portion>

Figure 10A:
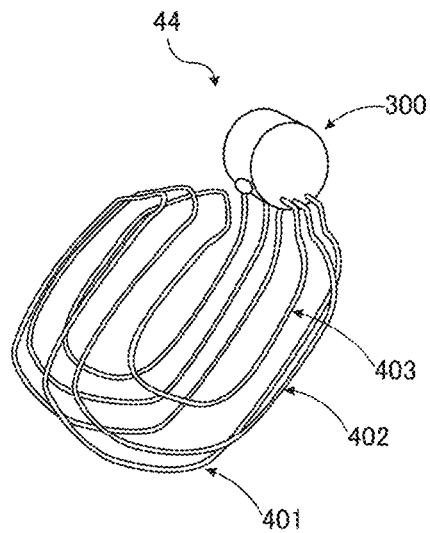
FIG. 10A is a diagram showing another example of the wire rod group of the finger portion of the robot hand according to the embodiment of the present invention and FIG. 10B is a diagram for explaining a wire rod in FIG. 10A.
Figure 10B:
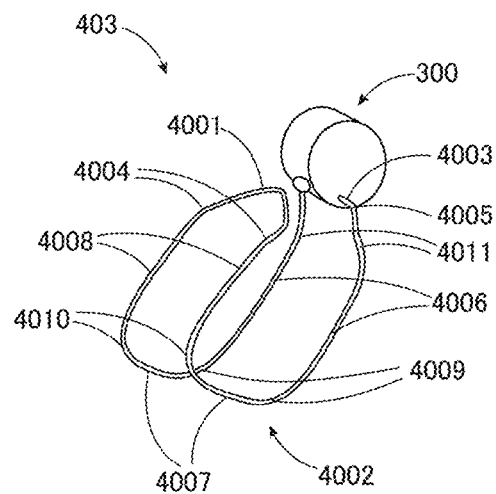

FIG. 10A is a diagram showing another example of the wire rod group of the finger portion of the robot hand according to the embodiment of the present invention, and FIG. 10B is a diagram for explaining a wire rod in FIG. 10A. The following description deals mainly with a difference from the aforementioned wire rod groups.

In this example, a wire rod group 44 is configured with three wire rods: a wire rod 401, a wire rod 402, and a wire rod 403. These wire rods each have a shape like a three-dimensional letter U (or a shape like a three-dimensional letter C), and the wire rod group 40 is a fourth-type wire rod group configured with arranged wire rods, each having a shape like a three-dimensional letter U (a shape like a three-dimensional letter C). The wire rod group 44 has a convex shape that is convex toward the dorsal, ventral, left, and right sides. In other words, the wire rod group 44 is configured with three wire rods forming layers on the dorsal, ventral, left, and right sides.

More specifically, first, the wire rods of the wire rod group 44, which are described taking the wire rod 403 as an example in FIG. 10B, are each bent in a shape like a two-dimensional order U as in the case of the wire rod of the aforementioned wire rod group, and both ends are fixed to the joint portion 300. As in the case of the aforementioned wire rod, when the loop shape is a shape like a letter U, first corner portions 4004 are formed between a tip 4001 and both limbs 4002. Second corner portions 4005 may be formed between both base ends 4003 and both limbs 4002, and fifth corner portions 4011 may be formed near the base ends, for example, by bending both limbs 4002.

In the present embodiment, both limbs 4002 of each wire rod having a shape like a two-dimensional letter U are further bent in a shape like a two-dimensional letter U, which provides the wire rod with a shape like a three-dimensional letter U as a whole. Each wire rod includes a pair of first vertical limbs 4006 which are both limbs 4002 extending from both base ends 4003 in the front-back direction, a pair of horizontal limbs 4007 which are both limbs 4002 extending from the pair of first vertical limbs 4006 in the dorsal-ventral direction, and a pair of second vertical limbs 4008 which are both limbs 4002 extending from the pair of horizontal limbs 4007 in the front-back direction. Moreover, a third corner portion 4009 is formed between the first vertical limb 4006 and the horizontal limb 4007, and a fourth corner portion 4010 is formed between the horizontal limb 4007 and the second vertical limb 4008. Preferably, in the wire rod group 44, the length of both limbs of the wire rod 401 is the largest and the space therebetween is the narrowest and the length of both limbs of the wire rod 403 is the smallest and the space therebetween is the widest.

As shown in FIG. 10A, the wire rod group 44 is configured with these wire rods having the shape of a three-dimensional letter U which are arranged so as to form the convex surfaces on the ventral side, the dorsal side, the left side, and the right side. More specifically, on the ventral side, the first vertical limbs of the wire rods are arranged toward the dorsal side in the order of the first wire rod 401, the second wire rod 402, and the third wire rod 403; on the dorsal side, the second vertical limbs and the tips of the wire rods are arranged toward the ventral side in the order of the first wire rod 401, the second wire rod 402, and the third wire rod 403; on the left side, the limbs and the tips of the wire rods are arranged toward the right side in the order of the third wire rod 403, the second wire rod 402, and the first wire rod 401; on the right side, the limbs and the tips of the wire rods are arranged toward the left side in the order of the third wire rod 403, the second wire rod 402, and the first wire rod 401. This allows the phalanx portions to bend when pressed from all directions: 360 degrees and reduce an impact and grip an object in cooperation with one another.

<Finger Portion of the Robot Hand>

Figure 11:
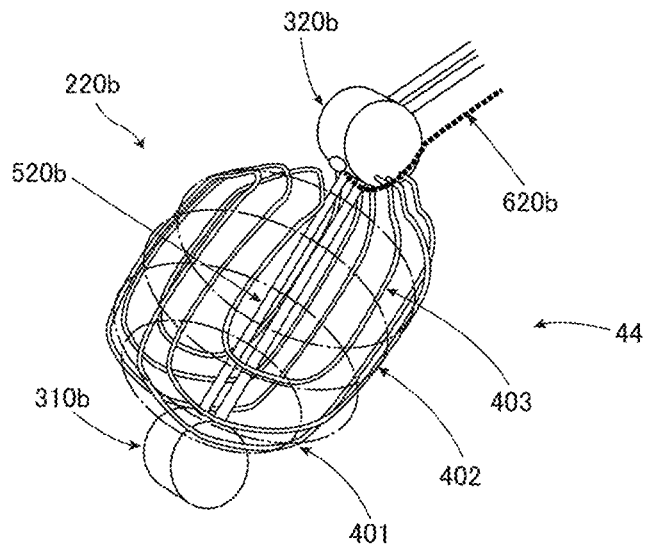
FIG. 11 is a diagram showing one example of the finger portion of the robot hand according to the embodiment of the present invention and is a partially enlarged view of the finger portion of FIG. 2.

FIG. 11 is a diagram showing one example of the finger portion of the robot hand according to the embodiment of the present invention and is a partially enlarged view of FIG. 2. In this example, an example of the second phalanx portion of the finger portion of FIG. 2 will be described. The wire rod group in the second phalanx portion is the aforementioned fourth-type wire rod group 44.

As shown in the drawing, the outer shape of the second phalanx portion 220b is formed of the fourth-type wire rod group 44 including the wire rod 401, the wire rod 402, and the wire rod 403, and the second finger bone member 520b is surrounded by the wire rod group 44. The wire rod group 44 is fixed to the second finger joint portion 320b and has an opening in the shape of a three-dimensional letter U facing rearward. The second phalanx portion 220b has convex surfaces on the left, right, dorsal, and ventral surfaces and includes a roughly cylindrical frame as indicated by imaginary lines shown in the drawing. It is to be noted that, in this example, the second phalanx portion 220b has a shape like a cylinder whose cross-sectional area is large in a central part and is gradually reduced toward the front and rear ends. This allows the phalanx portions to bend when pressed from all directions: 360 degrees and reduce an impact and grip an object in cooperation with one another.

Figure 12A:
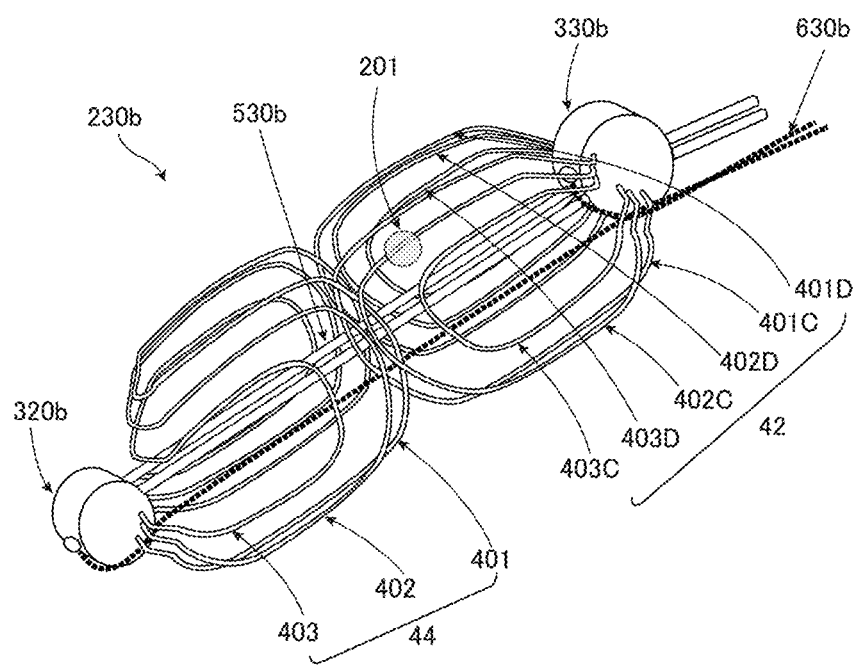
FIG. 12A is a diagram showing one example of the finger portion of the robot hand according to the embodiment of the present invention and is a partially enlarged view of FIG. 2.
Figure 12B:
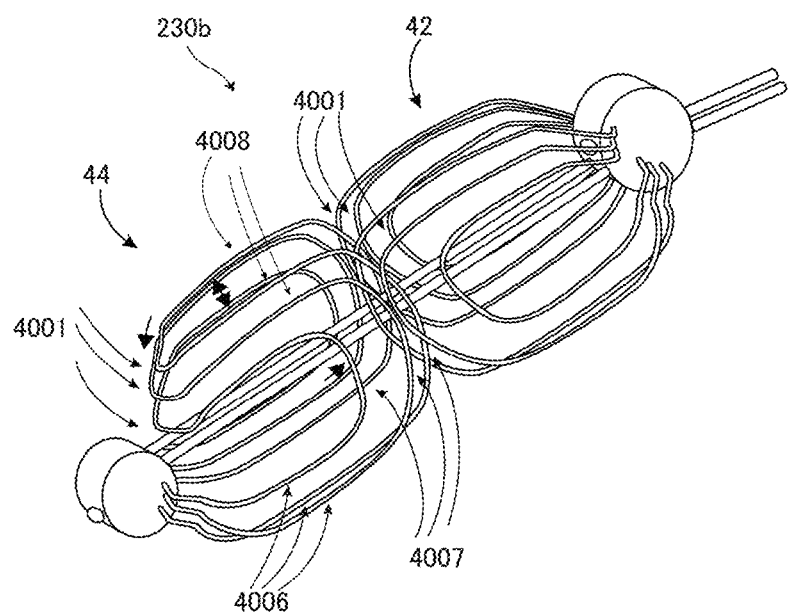
FIG. 12B is a diagram showing another example and is a partially enlarged view of FIG. 2.

FIGS. 12A and 12B are diagrams showing one example of the finger portion of the robot hand according to the embodiment of the present invention and are partially enlarged views of FIG. 2. In this example, the third phalanx portion of the finger portion of FIG. 2 will be described.

As shown in the drawing, the outer shape of the third phalanx portion 230b is formed of two wire rod groups: a wire rod group 44 (a first wire rod group) and a wire rod group 42 (a second wire rod group) which are placed such that the wire rod group 44 is located in front of the wire rod group 42 and the wire rod group 42 is located in back of the wire rod group 44, and the third finger bone member 530b is surrounded by these two wire rod groups. The first wire rod group is the aforementioned fourth-type wire rod group 44, and both ends of the wire rods are fixed to the second finger joint portion 320b. The second wire rod group is the aforementioned second-type wire rod group 42, and both ends of the wire rods are fixed to the third joint portion. That is, both ends of the two wire rod groups are fixed to the adjacent joint portions such that the wire rod groups face each other.

Consequently, as shown in the drawing, the first wire rod group 44 and the second wire rod group 42 in the third phalanx portion 230b are placed such that the horizontal limb 4007 of the first wire rod group 44 and the tip 4001 of the second wire rod group 42 face each other. Preferably, at least part of one of the wire rod groups enters between the wire rods of the other wire rod group. This allows the wire rod groups to move in cooperation with each other and can prevent the opening between the wire rods in each wire rod group from becoming too large. Furthermore, the wire rod groups can make contact with an object without causing an opening to appear between the wire rod groups even when the wire rod groups adjust the positions thereof.

Moreover, as shown in the drawing, by providing the displacement sensor 201 in a location near the tip or the horizontal limb of one or both of the wire rod groups, it is possible to detect a load near the tip and control the motion of the phalanx portion in accordance with the detected load. The displacement sensor may be a distortion sensor that detects distortion of a wire, a pressure sensor that detects pressure that is applied when a wire touches an object, an acceleration sensor that detects fluctuations, a gyro sensor, or the like. The displacement sensor may be an infrared sensor or a distance sensor that detects an approaching object.

Figure 13:
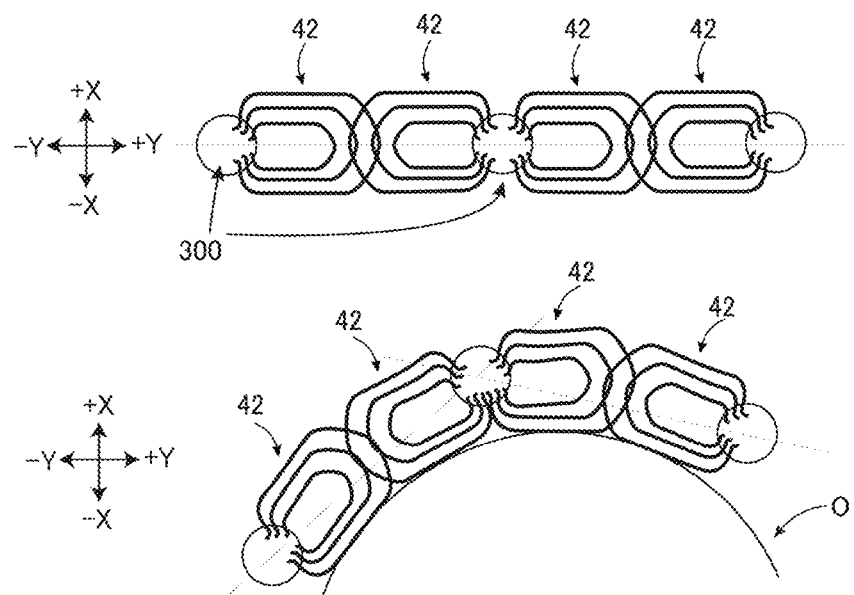
FIG. 13 is a schematic diagram showing one example of the finger portion of the robot hand according to the embodiment of the present invention.

FIG. 13 is a schematic diagram showing one example of the finger portion of the robot hand according to the embodiment of the present invention. As shown in the drawing, in the phalanx portion, both the first wire rod group and the second wire rod group may be the aforementioned second-type wire rod groups 42.

As shown in the drawing, by placing two wire rod groups 42, which are located between the joint portions 300, in the front-back direction (the extension direction) such that the tips face each other, when gripping an object O with the finger portion, it is possible to grip the object O in such a way as to wrap the finger portion around the object O without breaking the object O since the positions of the wire rod groups 42 are automatically adjusted, allowing the finger portion to bend along the outer shape (for example, a spherical shape) of the object O.

Moreover, placing the two wire rod groups 42 such that the tips thereof mutually get thereinto allows the wire rod groups 42 to make contact with the object O without the appearance of an opening between the wire rod groups even when the wire rod groups 42 adjust the positions thereof.

<Root Base Portion of the Robot Hand>

Figure 14:
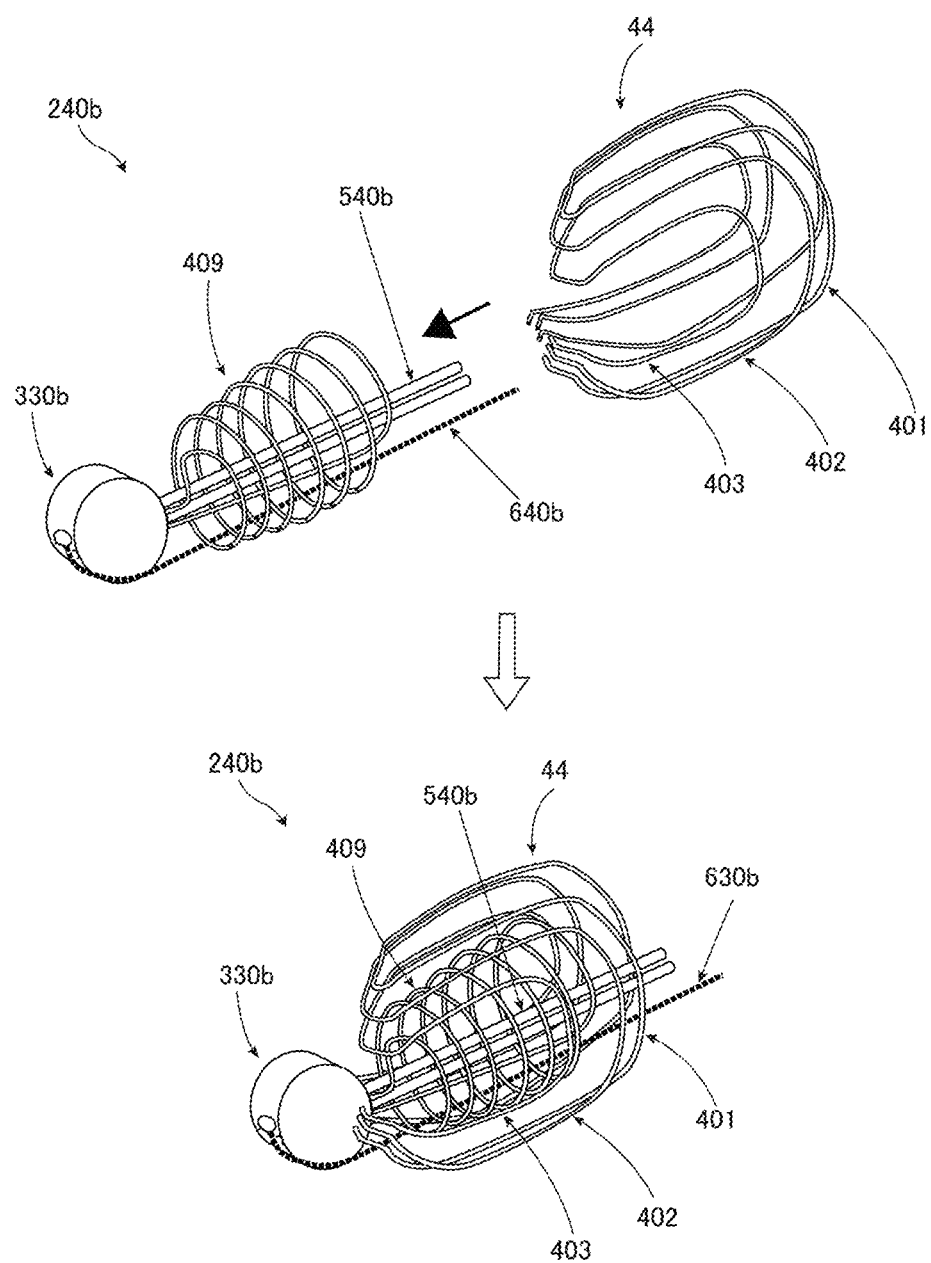
FIG. 14 is a diagram showing one example of a root base portion of the robot hand according to the embodiment of the present invention and is a partially enlarged view of FIG. 2.

FIG. 14 is a diagram showing one example of the root base portion of the robot hand according to the embodiment of the present invention and is a partially enlarged view of FIG. 2. In this example, an example of the root base portion of the finger portion of FIG. 2 will be described.

As shown in the drawing, the root base portion 240b includes a wire rod group 44 and a helical wire rod 409. In this example, an example of the fourth-type wire rod group 44 is shown in the drawing and described; the other wire rod group mentioned above may be used. The wire rod 409 is configured with one wire rod whose both ends are fixed to the rear end of the third finger joint portion 330b and whose central portion has a helical shape. As shown in the drawing, a root base bone member 540b is surrounded by the wire rod 409. Furthermore, the wire rod 409 is covered with the wire rod group 44, and the outer shape of the root base portion 240b is formed of the wire rod group 44. In other words, the root base portion 240b has a double-frame structure and the root base bone member 540b is doubly surrounded thereby.

As described above, by providing the root base portion 240b with the double-frame structure using the wire rod group and the helical wire rod, it is possible to protect the internal component portions such as the bone member and the tendon member even when the root base portion 240b hits an object hard. Moreover, it is possible to mitigate an impact on the entire robot. Furthermore, it is also possible to mitigate an impact on the object hit thereby.

<Finger Portion of the Robot Hand>

Figure 15:
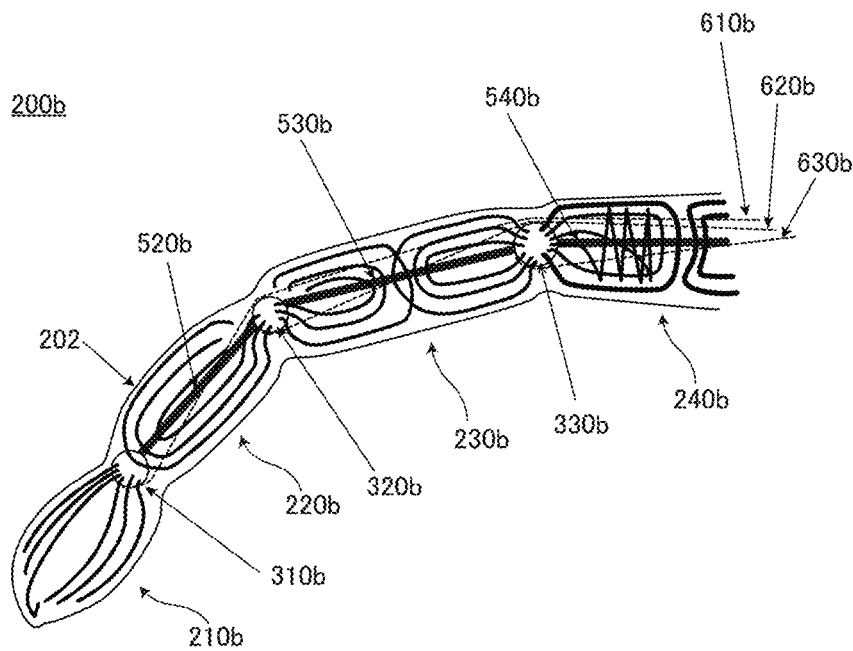
FIG. 15 is a diagram showing another example of the finger portion of the robot hand.

FIG. 15 is a diagram showing another example of the finger portion of the robot hand. As shown in the drawing, the finger portion 200b may include a skin portion 202 covering the entire finger portion 200b. Preferably, the entire hand 20 is covered with the skin portion 202. For example, one or more than one of materials such as silicone resin, nylon, cloth, rubber, and Kevlar® is used in the skin portion 202. Alternatively, the hand 20 may wear a glove. This makes it possible to prevent a physical object from adhering or sticking to the space between the wire rods when the physical object is very soft or has many protrusions on the surface thereof. Moreover, it is possible to reduce a frictional sound or the like that is produced between the members.

It is to be noted that the skin portion 202 may be formed so as to have a three-layer structure. More specifically, the skin portion 202 may be formed so as to have an exterior skin portion and an interior skin portion which are formed using fiber having stretchability and have a material having foamability (for example, in sponge form) or elasticity and flexibility and filling the space between the exterior skin portion and the interior skin portion or may be formed so as to have a portion into which they are integrated. The skin portion 202 may be formed so as to have a uniform thickness; the skin portion 202 may be provided with portions having different thicknesses, for example, a bulging portion and a dented portion to achieve a unique feeling (texture) and a sense of beauty.

<Hand Base Portion of the Robot Hand>

Figure 16:
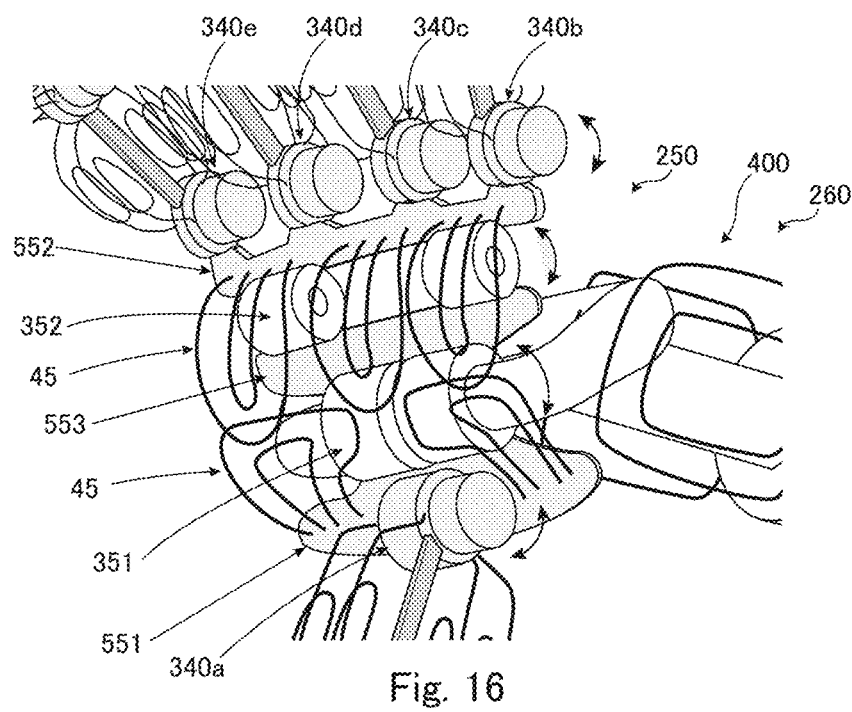
FIG. 16 is a diagram showing one example of a hand base portion of the robot hand according to the embodiment of the invention and is a partially enlarged view of FIG. 1.

FIG. 16 is a partially enlarged view of FIG. 1 and a diagram showing one example of the hand base portion of the robot hand. Preferably, the hand base portion 250 includes a hand base bone plate, a joint portion, and a wire rod group.

As one example, the hand base portion 250 includes a first hand base bone plate 551, a second hand base bone plate 552, and a third hand base bone plate 553, and each plate is plate-like in shape and a longitudinal direction is orthogonal to the extension direction of the root base portion. A first finger root base portion is rotatably connected to the first hand base bone plate 551 by a first root base joint portion 340a, and a second finger root base portion, a third finger root base portion, a fourth finger root base portion, and a fifth finger root base portion are rotatably connected to the second hand base bone plate 552 by a second root base joint portion 340b, a third root base joint portion 340c, a fourth root base joint portion 340d, and a fifth root base joint portion 340e, respectively.

The first hand base bone plate 551 is rotatably connected to the third hand base bone plate 553 by a first hand base joint portion 351, and the second hand base bone plate 552 is rotatably connected to the third hand base bone plate 553 by a second hand base joint portion 352.

A wire rod group 45 of the hand base portion 250 is a fifth-type wire rod group configured with two or more sets of wire rods, each set including a plurality of wire rods, which are arranged side by side. As one example, for example, the wire rod group 45 including two sets of wire rods, each set including two wire rods with loops of different sizes, is fixed to the first hand base bone plate 551 along the longitudinal direction. The wire rods of each set are placed with one on top of the other so as to be included in the same flat surface or curved surface as a whole. Furthermore, for example, the wire rod group 45 including three sets of wire rods, each set including two wire rods with loops of different sizes, is fixed to the second hand base bone plate 552 along the longitudinal direction. The wire rods of each set are placed with one on top of the other so as to be included in the same flat surface or curved surface as a whole. The two wire rod groups 45 are placed such that the tips thereof face each other. Moreover, as one example, the two wire rod groups 45 are placed such that a part of each tip gets into the other wire rod group.

The hand base portion 250 is attached to the forearm portion via the attachment portion 260. The attachment portion 260 is roughly Y-shaped and rotatably holds, at a bifurcated front end portion, both axial ends of the first hand base joint portion 351. The attachment portion 260 connects, at a rod-like rear end portion, to the tip portion of the forearm portion via the joint portion. As shown in the drawing, preferably, the attachment portion 260 is covered with a loop-like wire rod 400 having elasticity.

<Finger Portion of the Robot Hand>

Figure 17A:
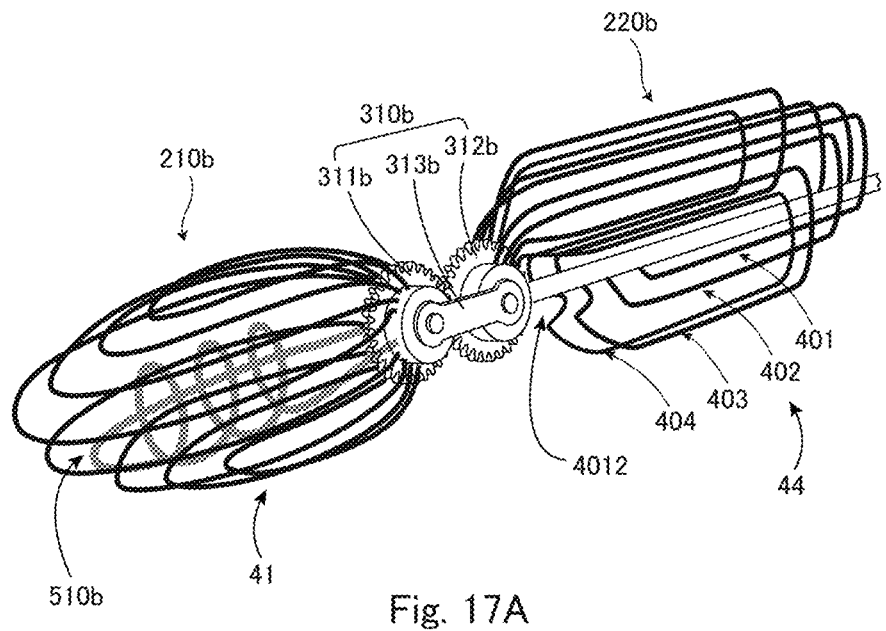
FIG. 17A is a diagram showing one example of the finger portion of the robot hand according to the embodiment of the present invention and FIG. 17B is a diagram for explaining one example of a wire rod in FIG. 17A.
Figure 17B:
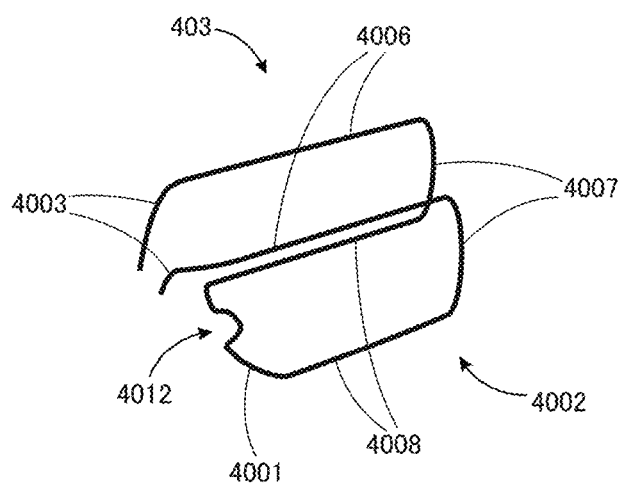

FIG. 17A is a diagram showing one example of the finger portion of the robot hand according to the embodiment of the present invention, and FIG. 17B is for explaining one example of a wire rod in FIG. 17A. In this example, a description will be given taking the first phalanx portion, the second phalanx portion, and the first joint portion of the second finger portion as an example; it goes without saying that a similar configuration may also be applied to the other phalanx portions and joint portions.

As one example, the first phalanx portion 210b includes a first-type wire rod group 41. In this example, the wire rod group 41 is configured with wire rods of a first set including four wire rods of different sizes, each having a roughly oval loop shape, and wire rods of a second set including four wire rods of different sizes, each having a shape similar to that of the rods of the first set, as in the case of the wire rods of the first set, the wire rods of the first set and the wire rods of the second set being arranged so as to face each other on the dorsal side and the ventral side.

The first phalanx portion 210b includes a first finger bone member 510b surrounded by the wire rod group 41. The first finger bone member 510b is configured with one wire rod (a second wire rod) which is a thick wire having a spring property and has stiffness higher than that of the aforementioned wire rod 400 (a first wire rod). Both ends of the second wire rod are fixed to the first finger joint portion 310*b*, and a central portion of the second wire rod is helical. As described above, the outer shape (frame) of the first phalanx portion 210*b* is formed of the wire rod group 41 configured with the first wire rod having low stiffness, and a reinforcing core material of the first phalanx portion 210*b* is formed of the first finger bone member 510*b* configured with the second wire rod having high stiffness.

As one example, the second phalanx portion 220*b* includes a fourth-type wire rod group 44. The wire rod group 44 is configured with four wire rod groups and each wire rod has a shape like a three-dimensional letter U. Each wire rod has the shape of a letter U when viewed from any of the right and left sides and the ventral side, and the wire rods have, as a whole, a shape like a rectangular cylinder, more specifically, a shape like a rectangular cylinder whose cross-sectional area is gradually reduced toward the front and rear ends.

As shown in the drawing, the wire rod group 44 has an avoiding portion 4012 that is recessed toward the side opposite to the joint portion and is formed in a loop portion of at least some of the wire rods. Providing the avoiding portion 4012 makes it possible to avoid contact with a gear or the like, which will be described later, and improve strength.

As shown in FIG. 17B, for example, a wire rod 403 has the avoiding portion 4012 that is recessed toward the side opposite to the joint portion and is formed at the tip 4001.

The first finger joint portion 310*b* includes a driven portion 311*b* that is provided on the side where the first phalanx portion 210*b* is located, a driving portion 312*b* that is provided on the side where the second phalanx portion 220*b* is located, and a coupling portion 313*b* coupling the driven portion 311*b* and the driving portion 312*b*. The driving portion 312*b* includes a motor, such as a servomotor, which is a power source.

<Robot (Humanoid Robot)>

The industrial robot usually works in a predetermined space mainly in a factory, and an arm thereof conducts work and a base thereof does not move. A working space of this kind of robot is separated from an area of activity of humans such that the robot does not collide with the humans. On the other hand, a working space of a non-industrial robot overlaps with the area of activity of the humans; for example, a cleaning robot does cleaning while moving around the area of activity of the humans and a communication robot performs communication with the humans. This kind of robot needs to protect itself from an impact caused by a collision or the like and to reduce an impact made on the other.

Figure 18:
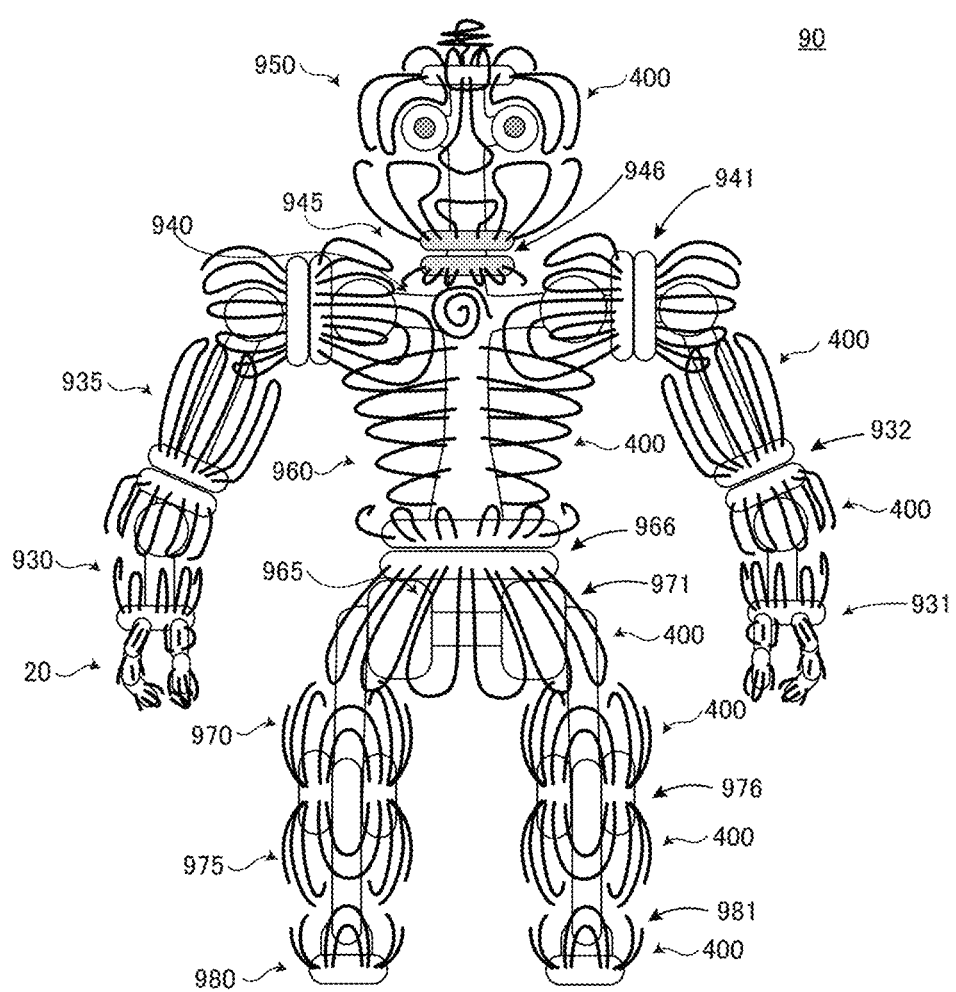
FIG. 18 is a diagram showing one example of a robot according to one embodiment of the present invention.

FIG. 18 is a diagram showing one example of a robot according to one embodiment of the present invention. In the present embodiment, an example of a humanoid robot will be described. The robot of the present embodiment can work as both an industrial robot and a non-industrial robot. Moreover, the robot of the present embodiment may behave like a family or friend, not acting as a working robot.

A robot 90 shown in the drawing includes at least a torso portion 960 and can move. As one example, the robot 90 includes the forearm portion 930, an upper arm portion 935, a shoulder portion 940, a neck portion 945, a head portion 950, the torso portion 960, a hip portion 965, a thigh portion 970, a lower leg portion 975, and a foot portion 980. These components each include a bone member and are movably coupled by joint portions. It is to be noted that, as shown in the drawing, a backbone member of the torso portion 960, a neck bone member of the neck portion 945, and a shoulder blade member of the shoulder portion 940 may be integrally formed as a trunk bone member in the shape of a cross. As one example, the aforementioned hand 20 is attached to the forearm portion 930.

The robot 90 includes, as the joint portions, a forearm joint portion 932 between the forearm portion and the upper arm portion, a shoulder joint portion 941 between the upper arm portion and the shoulder portion, a neck joint portion 946 between the neck portion and the head portion, a waist joint portion 966 between the hip portion and the torso portion, a hip joint portion 971 between the thigh portion and the hip portion, a knee joint portion 976 between the lower leg portion and the thigh portion, and an ankle joint portion 981 between the foot and the lower leg portion. These joint portions may be configured as the aforementioned joint portions or a publicly known technology may be used.

In the robot 90, the hand 20 can rotate about the axis of a forearm tip portion 931, the forearm portion 930 can rotate about the axis of the forearm joint portion 932, and the upper arm portion 935 can rotate about the axis of the shoulder joint portion 941. Moreover, the head portion 950 can rotate about the axis of the neck joint portion 946, the torso portion 960 can rotate about the axis of the waist joint portion 966, the thigh portion 970 can rotate about the axis of the hip joint portion 971, the lower leg portion 975 can rotate about the axis of the knee joint portion 976, and the foot portion 980 can rotate about the axis of the ankle joint portion 981.

As shown in the drawing, in the robot 90, the outer shape of each of the components, that is, the forearm portion 930, the upper arm portion 935, the shoulder portion 940, the neck portion 945, the head portion 950, the torso portion 960, the hip portion 965, the thigh portion 970, the lower leg portion 975, and the foot portion 980 is formed of the aforementioned wire rod 400 in the shape of a loop having elasticity and being provided so as to surround the bone member. The outer shape of each component may be formed of the aforementioned loop-like wire rods 400 surrounding the bone member or may be formed of one or two or more wire rod groups (the wire rod groups 41 to 45) mentioned above, each being configured with a plurality of wire rods 400 arranged at predetermined intervals, which surround the bone member.

As one example, the wire rod 400 or the wire rod group is provided in a prescribed manner such that the loop shape extends in an extension direction of the bone member, and both ends of the wire rod are fixed to the joint portion. As one example, the wire rod or the wire rod group is provided in a prescribed manner such that the loop shape extends in a direction intersecting the bone member, and both ends of the wire rod are fixed to the bone member. It is to be noted that, like a robot 80 which will be described later, the outer shape of one or more than one component may be formed of a helical wire rod.

Preferably, an upper limb portion, that is, the forearm portion 930 and the upper arm portion 935 are provided in a prescribed manner such that the loop shape of the wire rod or the wire rod group extends in the extension direction of the bone member, and an end of the wire rod is fixed to the joint portion. Preferably, a lower limb portion, that is, the thigh portion 970 and the lower leg portion 975 are configured in a similar manner. Moreover, the shoulder portion 940 may also be configured in a similar manner.

Preferably, the head portion 950 includes a vertically extending skull member and the wire rod or the wire rod group is provided in a prescribed manner so as to extend in an extension direction of the skull member. Both ends of the wire rod may be fixed to the neck joint portion or may be fixed to an upper end, which is formed so as to extend horizontally, of the skull member. As shown in the drawing, both ends of an upper wire rod 400 may be fixed to the upper end of the skull member and both ends of a lower wire rod 400 may be fixed to the neck joint portion. Moreover, as one example, an eye socket portion is formed by bending a part of the loop shape of the wire rod 400 and the outer shape of a nose, a mouth, a cheek, or the like is also formed of the wire rod 400.

Preferably, the torso portion 960 is provided in a prescribed manner such that the loop shape of the wire rod or the wire rod group extends in a direction intersecting the extension direction of the bone member, and both ends of the wire rod are fixed to the bone member. The wire rod 400 has, for example, a shape like a letter C as shown in the drawing. In the torso portion 960, the wire rod 400 surrounding the left side of the backbone member and the wire rod 400 surrounding the right side of the backbone member are different wire rods, and the outer shape of the left side of the torso portion 960 is formed of a plurality of wire rods 400 on the left side and the outer shape of the right side of the torso portion 960 is formed of a plurality of wire rods 400 on the right side. Preferably, the outer shape on the left side and the outer shape on the right side are formed so as to be symmetric with respect to a line. It is to be noted that the outer shape of the torso portion 960 may be formed like a torso portion of the robot 80 which will be described later.

As mentioned earlier, the displacement sensor is provided in the wire rod or the wire rod group of the hand and detects the softness, weight, angle and so forth of a physical object, which allows a control portion (a built-in microcontroller, a control PC for remote control, or the like) to control the motion of the robot hand such that the robot hand moves in accordance with the physical object. For example, it is possible to stop the robot hand, change the orientation thereof, move the robot hand in a different direction, catch the physical object, and hold the physical object in the palm thereof.

The displacement sensor may also be provided in other components. The displacement sensor makes it possible to detect the softness, weight, angle and so forth of a physical object and make a control portion (a built-in microcontroller, a control PC for remote control, or the like) control the motion of the robot such that the robot moves in accordance with the physical object. For example, it is possible to stop the robot, change the orientation thereof, move the robot in a different direction, catch the physical object with the hand, and hold the physical object in the palm thereof. Moreover, the motion of the other component may be controlled by the sensor provided in the hand.

It is to be noted that a conventional technology is used as appropriate in a sensor other than those mentioned above, intelligence and control, and a drive system configuration.

Forming the outer shape using the wire rod as described above makes it possible for the robot 90 to protect itself from an impact even when the robot 90 falls down or collides. Moreover, this makes the robot 90 less likely to damage what it has collided with. Furthermore, using the wire rod makes it possible to achieve light weight and provides many openings, which reduces air resistance. In addition, the wire rod is inexpensive, eliminates the need for a mold for the outer shape, and is easily worked on because it is obtained just by bending a wire.

Moreover, it is only necessary to manufacture the wire rod using a wire with a smooth surface from the beginning, which makes a burr less likely to appear in a surface layer. Furthermore, making the wire rod easily detachable as will be described later makes it possible to detach the wire rod and wash it just by, for example, pouring water thereover, which brings about the advantage of good hygiene as well.

The robot 90 may include a skin portion covering the outer side (the outer shape formed of the wire rod).

Preferably, the entire robot 90 is covered with the skin portion. For example, one or more than one of materials such as silicone resin, nylon, cloth, rubber, and Kevlar® is used in the skin portion.

The skin portion may be formed so as to have a three-layer structure. More specifically, the skin portion may be formed so as to have an exterior skin portion and an interior skin portion which are formed using fiber having stretchability and have a material having foamability (for example, in sponge form) or elasticity and flexibility and filling the space between the exterior skin portion and the interior skin portion or may be formed so as to have a portion into which they are integrated. The skin portion may be formed so as to have a uniform thickness; the skin portion may be provided with portions having different thicknesses, for example, a bulging portion and a dented portion to achieve a unique feeling (texture) and a sense of beauty.

Figure 19:
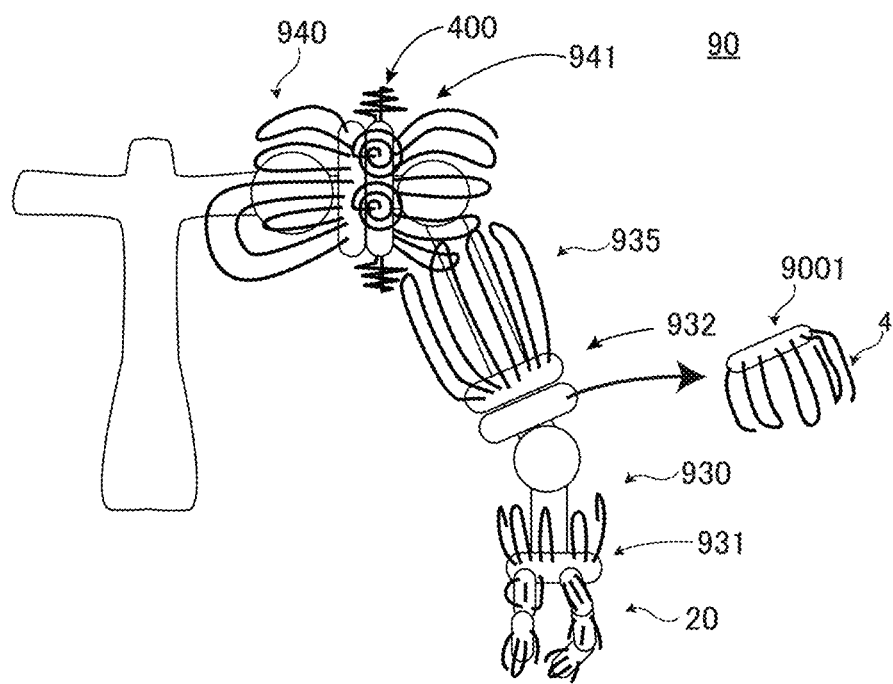
FIG. 19 is a diagram showing another example of the robot of FIG. 18.

FIG. 19 is a diagram showing another example of the robot of FIG. 18. Some of the configurations are omitted in the drawing.

As one example, as shown in the drawing, the wire rod 400 is detachably attached to the joint portion or the bone member via a receiving member 9001. The receiving member 9001 is detachably attached to the joint portion of the robot 90 with a screw or bolt, for example. As one example, the wire rod 400 is attached and fixed to the receiving member 9001 like a wire rod fixation structure which will be described later. It is to be noted that the same goes for the wire rod group. This configuration makes it easy for the robot 90 to make repairs on the internal mechanical portions and wiring and circuits.

The outer shape of the robot 90 may be formed so as to include the wire rod surrounding the joint portion, such that the joint portion is protected. As shown in the drawing, a helical wire rod may be used as the wire rod 400. Moreover, a helical wire rod may be used in other portions in addition to the joint portion.

FIG. 24 is a diagram showing another example of the robot of FIG. 18. Some of the configurations are omitted in the drawing. In this example, a face portion of the head portion 950 is different from that of the aforementioned example.

The head portion 950 has a face portion 951 that can be separated into two or more parts to make it easy to make repairs on the internal circuit, wiring, and the like. As one example, as shown in the drawing, in the face portion 951, two bone members are provided in a prescribed manner in each of an eye socket portion and a mouth portion, which makes it possible to separate the face portion 951 into three portions: an upper portion 9511, a middle portion 9512, and a lower portion 9513. Specifically, the face portion 951 is configured such that, with the eye socket portion and the mouth portion used as the boundaries, a part above an upper portion of the eye socket portion is included in the upper portion 9511, a part below a lower lip portion is included in the lower portion 9513, and a part therebetween is included in the middle portion 9512.

Preferably, an ear portion 9514, an eye portion 9515, and a mouth portion 9516 are also included in the face portion 951; the ear portion 9514 is included in the upper portion 9511, the eye portion 9515 is included in the middle portion 9512, and the upper half of the mouth portion 9516 is included in the middle portion 9512 and the lower half of the mouth portion 9516 is included in the lower portion 9513. Moreover, the ear portion 9514 is rotatably attached to the upper portion of the eye socket portion so as to be held up and keep out of the way at the time of separation.

<Robot (Nonhumanoid Robot)>

FIG. 25 is a diagram showing one example of a robot according to one embodiment of the present invention and is a diagram viewed from the side. FIGS. 26A and 26B are each one example of an AA-line end view of FIG. 25. In the present embodiment, one example of a nonhumanoid robot, such as what is called a pet robot or companion robot, other than the humanoid robot will be described.

The robot 80 includes at least a torso portion and can move. As one example, the robot 80 includes a head portion 801, a torso portion 802, and a moving portion 803 as components. Moreover, preferably, the robot 80 includes a skin portion 804 covering the outer side (the outer shape formed of a wire rod which will be described later). The skin portion 804 can be configured in the same manner as the skin portion of the aforementioned robot 90 and detailed explanations thereof are omitted.

In the robot 80, the head portion 801 and the torso portion 802 have, roughly in the center thereof, a backbone member 805 which is a common bone member. The backbone member 805 extends downward from the torso portion 802 and connects to the moving portion 803. Preferably, the backbone member 805 inclines somewhat diagonally forward and connects to a front portion of the moving portion 803. The moving portion 803 includes two large front wheels and one rear wheel which is a safety wheel, and includes an unillustrated drive mechanism, which allows the moving portion 803 to travel. The front wheels and the rear wheel are coupled by a front-rear wheel coupling portion 806. The head portion 801 includes an eye portion 807 configured with a display, a sensor, and the like.

The outer shape of the robot 80 is formed so as to surround the bone member with the aforementioned wire rods 400. As mentioned earlier, the wire rod 400 is a metal wire rod having elasticity and preferably being circular in cross section. As one example, the wire rods 400 are each formed in the aforementioned loop shape and are placed so as to extend in an extension direction of the backbone member 805, whereby the outer shape is formed so as to have an opening extending in the longitudinal direction. The outer shape of the robot 80 may be formed of one or two or more wire rod groups (the wire rod groups 41 to 45) mentioned above in this way.

As one example, the outer shape of the robot 80 is formed of the wire rods 400 which are placed, in the head portion 801 and the torso portion 802, such that an extension direction thereof intersects the extension direction of the backbone member 805 and the wire rods 400 have an opening, which is greater than or equal to the thickness of the wire rod, between the adjacent wire rods 400. Both ends of the wire rod 400 are fixed to the backbone member 805. The following description deals with an example of the torso portion; the same goes for the head portion.

For example, as shown in FIG. 26A, the backbone member 805 is surrounded by a pair of wire rods 400 having a roughly semicircular or fan-like loop shape. The loop shape of the wire rod 400 extends in a cross-sectional direction of the backbone member 805. More specifically, an arc-shaped part, which protrudes outward, of one of the wire rods 400 forms the outer shape of an abdomen, and an arc-shaped part, which protrudes outward, of the other wire rod 400 forms the outer shape of a back. In other words, in the torso portion 802, the wire rod surrounding the ventral side of the backbone member and the wire rod surrounding the dorsal side of the backbone member are different wire rods; the ventral-side outer shape is formed of the wire rods on the ventral side and the dorsal-side outer shape is formed of the wire rods on the dorsal side. A corner portion between the arc-shaped part forming the outer shape and a connecting part connecting to the backbone member 805 is rounded, which makes it possible for the corner portion to absorb a force by bending toward the connecting part when the force is applied to the corner portion from outside. Preferably, the connecting part is formed into a somewhat curved shape, in other words, an arc shape having a larger radius of curvature than that of the arc-shaped part. Though not shown in the drawing, the backbone member 805 may be surrounded by three wire rods 400 having a fan-like loop shape and the outer shape may be formed of three parts, or the backbone member 805 may be surrounded by four or more wire rods 400 having a fan-like loop shape and the outer shape may be formed of four or more parts.

In the robot 80, the displacement sensor may be provided in the wire rod or the wire rod group in one or two or more components mentioned above in the same manner as the above-mentioned robot 90.

It is to be noted that a conventional technology is used as appropriate in a sensor other than those mentioned above, intelligence and control, and a drive system configuration.

By forming the outer shape of the robot 80 of the present embodiment using the wire rod 400 as described above, when the robot 80 falls down or collides, for example, the robot 80 can protect itself with the wire rod 400 that bends in response to external pressure from surrounding directions and mitigates an impact. Moreover, this makes the robot 80 less likely to damage what it has collided with. Furthermore, the wire rod 400 is inexpensive, eliminates the need for a mold for the outer shape, and is easily worked on because it is obtained just by bending a wire.

In the robot 80 of the present embodiment, as shown in FIG. 26B, the backbone member 805 may be surrounded by four wire rods 400 in the shape of a check mark. Each wire rod 400 is fixed to the backbone member 805 at one end of a connecting part which is a straight-line part (or an arc-shaped part whose radius of curvature is larger than that of an arc-shaped part), and forms the ventral-side or dorsal-side outer shape with the arc-shaped part of the other wire rod which the wire rod 400 faces in the arc-shaped part thereof. Consequently, on the ventral side and the dorsal side, an opening 4027 is formed between the wire rods 400 facing each other. Since the robot 80 has the opening 4027 in the wire rod 400 forming the outer shape of the torso portion 802, when the robot 80 is subjected to an impact, the arc-shaped part bends inward, which allows the robot 80 to dodge and mitigate the impact.

The wire rod 400 may be attached directly to the backbone member 805; as shown in FIG. 26B, the wire rod 400 may be attached to the backbone member 805 via a receiving member 9002. The receiving member 9002 is detachably attached to the backbone member 805 with a screw or bolt, for example. The wire rod 400 is attached to the receiving member 9002 using any one of the wire rod fixation structures, which will be described later, or a conventional technology.

FIGS. 27A to 27D are diagrams, each showing another example of the robot of FIG. 25. The wire rod 400 may have a three-dimensional shape having a predetermined width in the extension direction of the backbone member 805.

Figure 27A:
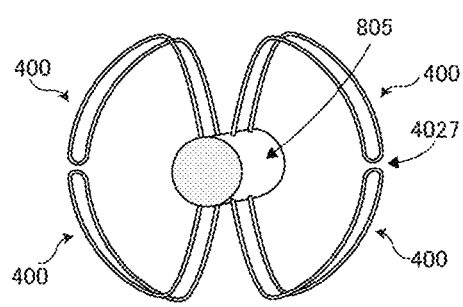
FIG. 27A is a diagram showing another example of the robot of FIG. 25.

As shown in FIG. 27A, four wire rods 400 surrounding the backbone member 805 each have the shape of a three-dimensional check mark obtained by further bending a wire rod having a loop shape into the shape of a check mark. Each wire rod 400 has a predetermined vertical width in the extension direction of the backbone member 805.

Figure 27B:
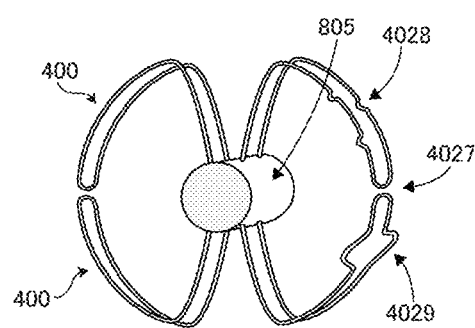
FIG. 27B is a diagram showing another example.

As shown in FIG. 27B, the above-mentioned wire rod 400 surrounding the backbone member 805 may have, in part or the whole thereof, one or two or more depressions 4028 recessed (or projections 4028 projecting) in the radial direction of the backbone member 805. Moreover, the above-mentioned wire rod 400 surrounding the backbone member 805 may have one or two or more projections 4029 projecting (or depressions 4029 recessed) in the extension direction of the backbone member 805. Providing these depressions or projections makes it possible to prevent the skin portion from slipping.

Figure 27C:
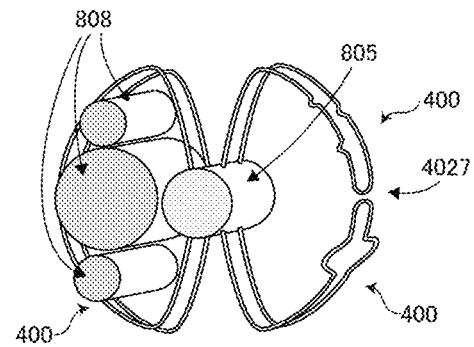
FIG. 27C is a diagram showing another example.

As shown in FIG. 27C, in the robot 80, a filling member 808 may be provided in an abdomen or back surrounded by the above-mentioned wire rod 400. For example, a sponge-like material is used as the filling member 808. This makes it possible for a person to achieve a proper feeling when making contact with the robot 80 by, for example, hugging it.

Figure 27D:
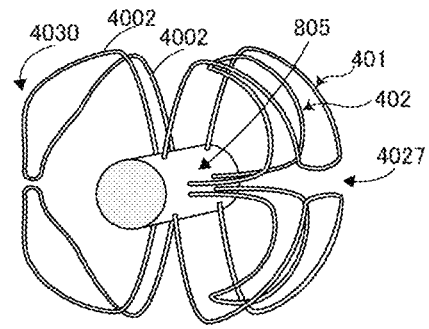
FIG. 27D is a diagram showing another example.

As shown in FIG. 27D, in part or the whole of the above-mentioned wire rod 400 surrounding the backbone member 805, the space between both limbs 4002 of the wire rod 400 in the shape of a three-dimensional check mark may be nonuniform and a widened portion 4030 may be formed. Moreover, another wire rod 400 may be placed inside part or the whole of the above-mentioned wire rod 400 surrounding the backbone member 805, such that these wire rods 400 surround the backbone member 805 in layers to form the outer shape of the torso portion. For example, as shown in the drawing, inside a wire rod 401 in the shape of a three-dimensional check mark, a wire rod 402 in the shape of a three-dimensional check mark which is formed so as to be smaller than the wire rod 401 is placed such that the arc-shaped parts form layers. The wire rod 401 and the wire rod 402 may be placed so as to face each as shown in the drawing or may be placed in the same direction.

Figure 28:
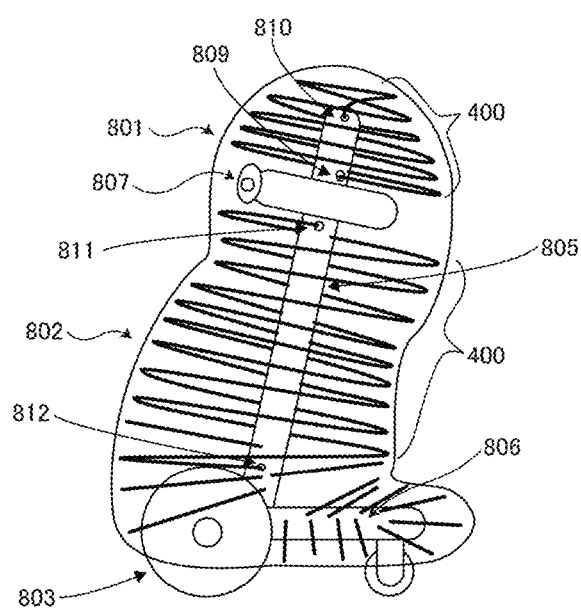
FIG. 28 is a diagram showing another example of the robot of FIG. 25.

FIG. 28 is a diagram showing another example of the robot of FIG. 25. In this example, the shape of the wire rod 400 forming the outer shape of the head portion 801 and the torso portion 802 of the robot 80 is different from that of the aforementioned example.

As one example, as shown in the drawing, the outer shape of the head portion 801 and the torso portion 802 includes: an outer shape located above the eye portion 807, which is used as a boundary, and formed of one helical wire rod 400; and an outer shape located below the eye portion 807 and formed of one helical wire rod 400. One end 809 of the upper wire rod 400 is fixed to the backbone member 805 near the eye portion 807 and the other end 810 of the upper wire rod 400 is fixed to an area of the backbone member 805 near the upper end thereof. The upper wire rod 400 has a helical shape which is roughly hemispherical and spreads outward and downward, and the upper end of the helical shape is located above the upper end of the backbone member 805. One end 811 of the lower wire rod 400 is fixed to the backbone member 805 near the eye portion 807 and the other end 812 of the lower wire rod 400 is fixed to an area of the backbone member 805 near the lower end thereof. The lower wire rod 400 is formed in a shape like a cylinder; preferably, a pitch in a lower part on the ventral side is larger than that on the dorsal side and a lower end covers an upper part of the moving portion 803.

By configuring the robot 80 in this manner, it is possible to form the outer shape thereof more easily. Moreover, since the number of ends to be fixed is small and the number of corners is small, a softer feeling is achieved.

It is to be noted that the outer shape of the head portion 801 and the torso portion 802 may be formed of one helical wire rod 400 or may be formed of three or more helical wire rods 400. Moreover, the outer shape may be formed by placing another helical wire rod inside the helical wire rod 400 and concentrically providing two or more layers in a prescribed manner.

<Robot Hand and Finger Portion of the Robot Hand>

Figure 20:
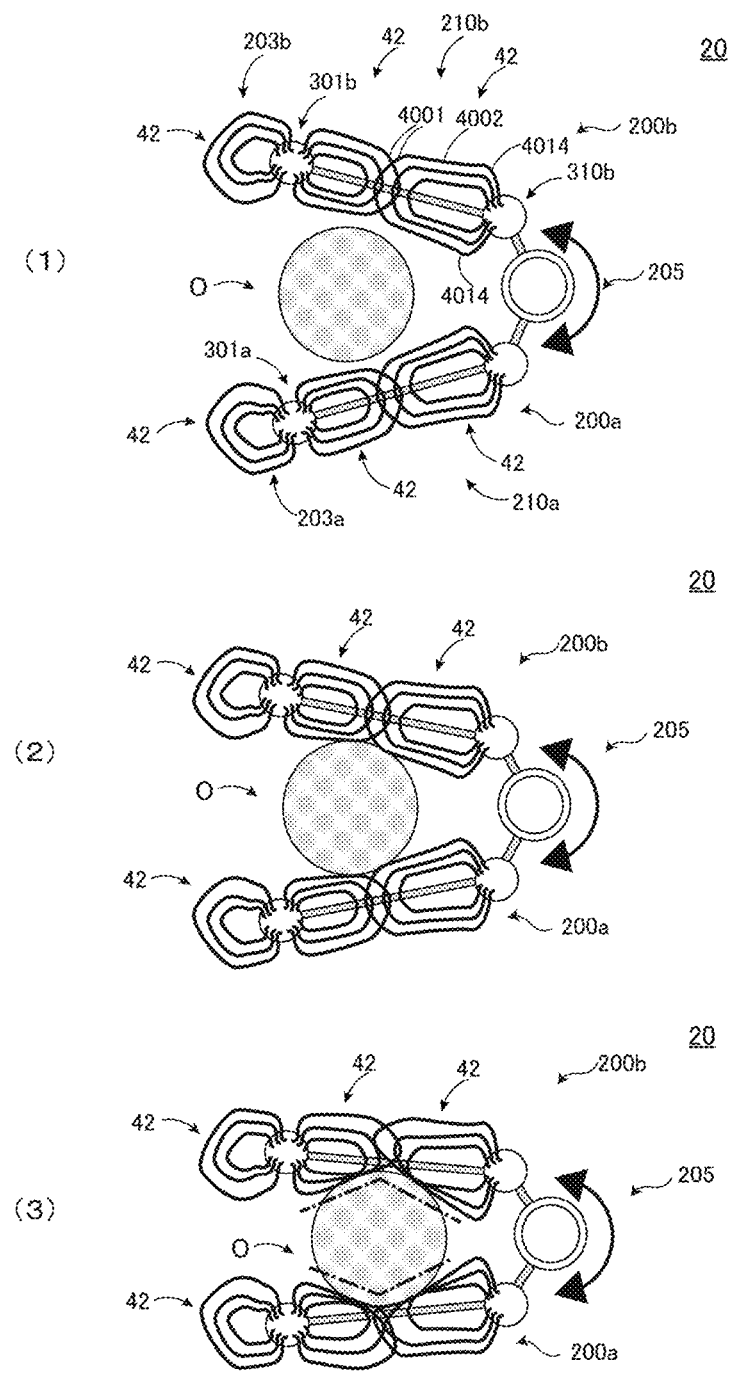
FIG. 20 is a schematic diagram showing one example of a robot hand according to one embodiment of the present invention and a finger portion thereof.
Figure 21:
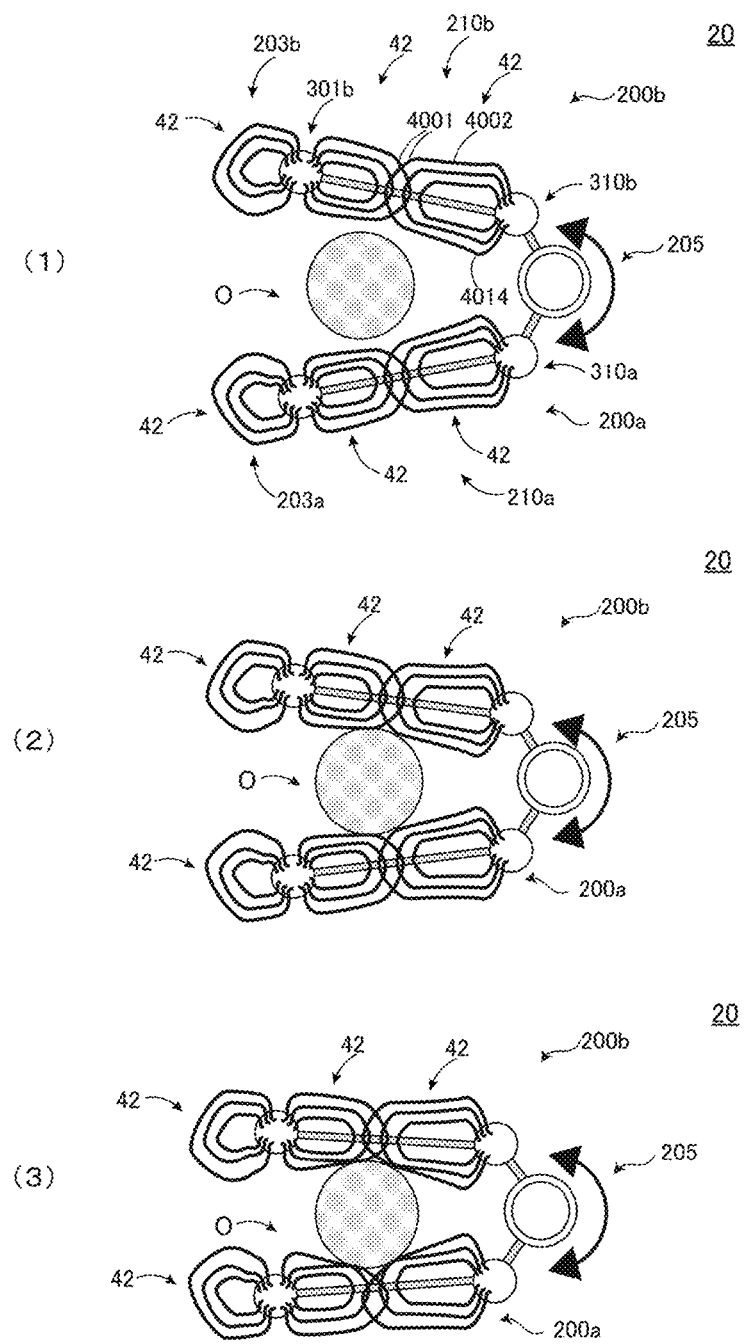
FIG. 21 is a schematic diagram showing the example of the robot hand according to the embodiment of the present invention and the finger portion thereof.

FIGS. 20 and 21 are schematic diagrams showing one example of a robot hand according to one embodiment of the present invention and a finger portion thereof. In this example, an example in which one finger portion 200a and one finger portion 200b are placed so as to face each other is shown in the drawing; the number of finger portions may be set such that one finger portion and two finger portions face each other or more than one finger portion and more than one finger portion face each other. One of these finger portions gets close to the other and separates from the other or these finger portions get close to each other and separate from each other, whereby the hand 20 is opened and closed and grips a physical object.

In this example, by being driven by a driving portion 205, the finger portion 200a and the finger portion 200b are rotated in an arrow direction, which allows them to get close to each other to grip an object O or separate from each other to release the object O. The finger portions are symmetrically configured, and the following description deals with the finger portion 200b as an example.

The finger portion 200b includes a first phalanx portion 210b and a nail-at-the-tip 203b. The nail-at-the-tip 203b is connected to the first phalanx portion 210b by a tip connecting portion 301b having no bending capability. The first phalanx portion 210b is connected to the driving portion 205 by a first connecting portion 310b.

As one example, the outer shape of the first phalanx portion 210b is formed of two second-type wire rod groups 42, that is, a front-end-side wire rod group placed on the front end side, which is the tip side in the extension direction of the finger portion, and a rear-end-side wire rod group placed on the rear end side opposite to the front end side, and the two wire rod groups 42 are fixed so as to face each other, such that the tail ends of the wire rods are not exposed in the adjacent tip connecting portion 301b and the adjacent first connecting portion 310b.

Preferably, the wire rod groups of the first phalanx portion 210b are configured such that the object O gets closer to the front end side than the rear end side. As one example, by providing, on the rear end side of a limb 4002 of each wire rod of the rear-end-side wire rod group 42, a rear end protruding portion 4014 protruding in the dorsal-ventral direction, the first phalanx portion 210b can make the object O get closer to the front end side than the rear end side. The rear end protruding portion 4014 may be the aforementioned fifth corner portion or may be provided separately. Moreover, by making the space between both limbs 4002 of each wire rod of the rear-end-side wire rod group 42 on the tip side narrower than that on the rear end side, the object O may be made to get closer to the front end side than the rear end side. Furthermore, by making the stiffness of the limb 4002, on the rear end side, of each wire rod of the rear-end-side wire rod group 42 higher than the stiffness of the limb 4002 on the tip side, the object O may be made to get closer to the front end side than the rear end side.

FIG. 20 shows a case where a cylindrical object O having a large diameter is gripped. In this case, the object O is gripped with the ventral sides of the wire rod groups of the finger portion 200a and the finger portion 200b; the object O gets closer to the front end side than the rear end because the rear-end-side wire rod group 42 includes, for example, the rear end protruding portion 4014, which makes it possible to grip the object O without hampering movement of the driving portion 205 located in a rearward position. In this example, the object O is gripped between tips 4001 of the wire rod groups.

As shown in (2) of FIG. 20, the wire rod groups of the finger portion 200a and the finger portion 200b grip and lift the object O with the closest wire rods, which are closest to the object O, making contact with the object O first. When the object O is too heavy to be gripped and lifted or in order to grip the object O with reliability (for example, in order to stably grip the object O by making it get closer to the center when, for example, an attempt is made to grip the object O in a position off an area near the center of the finger portion), as shown in (3) of FIG. 20, the wire rod groups of both finger portions bend greatly (see dash-dotted lines shown in the drawing), and the closest wire rods make contact with the object O, the second closest wire rods second closest to the object O make contact with the object O, and the farthest wire rods then make contact with the object O, which makes it possible for the wire rod groups to grip and lift the object O. In this case, since a loop wire (a loop-like wire rod) is attached to a joint portion, the tip side of the loop wire bends using the joint side of the loop wire as a support shaft. This causes a portion in contact with the object O (the center of gravity of the object O) to be moved toward the center between joints and allows the object O to be gripped elastically in a stable position.

In the wire rod group 42, each wire rod is formed such that almost the entirety of the loop shape is included in a plane parallel to the dorsal-ventral direction; in this example, both wire rod groups are included and, in both wire rod groups 42, the tips of at least some of the wire rods of one wire rod group get into the other wire rod group, which makes it possible to prevent the space between the wire rods from becoming too large and stably grip the object O. In doing so, it is possible to move the object O to the center between the joints as mentioned above and grip the object O.

As shown in FIG. 21, when the object O is somewhat small and it is impossible to grip and lift the object O with the closest wire rods, which are closest to the object O, making contact with the object O, the closest wire rods make contact with the object O and the second closest wire rods second closest to the object O make contact with the object O as shown in (3) of FIG. 21, whereby it is possible to grip and lift the object O.

<Wire Rod Retaining Portion (Wire Rod Fixation (Mounting) Structure)>

Figure 22A:
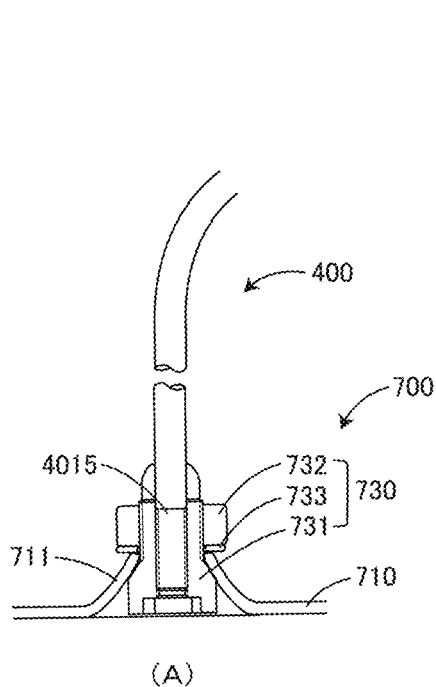
FIG. 22A is a diagram showing a wire rod retaining portion (after mounting) according to one embodiment of the present invention and FIG. 22B is a diagram showing the wire rod retaining portion (before mounting) according to the embodiment of the present invention.
Figure 22B:
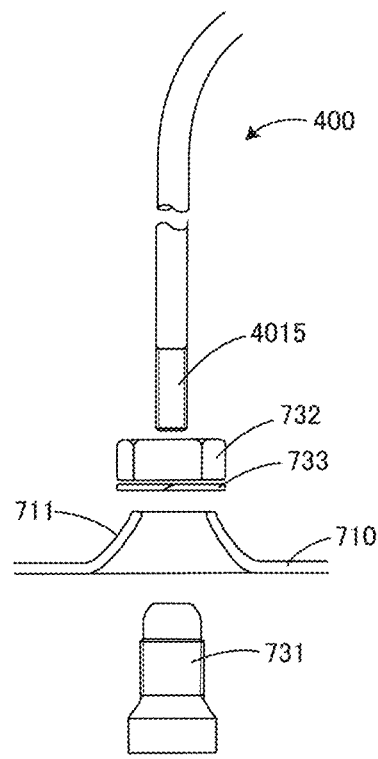

FIG. 22A is a diagram showing a wire rod retaining portion (after mounting) according to one embodiment of the present invention. FIG. 22B is a diagram showing the wire rod retaining portion (before mounting) according to the embodiment of the present invention.

A wire rod retaining portion 700 includes a receiving portion 710 and a stopper 730. As one example, the receiving portion 710 is a joint portion, a connecting portion, a bone plate, or the like. In this example, the plate-like receiving portion 710 is shown in the drawing; the receiving portion 710 is not limited thereto and may have an appropriate shape. The receiving portion 710 includes a hole portion 711. The hole portion 711 has a through hole passing through the center, and a peripheral wall portion around the hole has a roughly tapered shape when viewed in cross section.

As one example, the stopper 730 includes a bolt member 731 inserted into the hole portion 711, a nut 732 threadedly engaging an external thread portion of the bolt member 731, and a washer 733 between the bolt member 731 and the nut 732.

The bolt member 731 has a hexagonal hole in a head portion. Moreover, a part of the bolt member 731 adjacent to a shaft portion of the head portion has a roughly tapered shape when viewed in cross section, and this tapered part makes contact with the peripheral wall portion of the hole portion 711. The shaft portion of the bolt member 731 has an external thread on the outer periphery thereof, and the tip of the shaft portion is shaped such that the diameter thereof is reduced so as to be tapered. Moreover, the bolt member 731 has a through hole passing through the center of the shaft portion or both the head portion and the shaft portion in an axial direction, and an internal thread is provided on the inner periphery of the through hole. The wire rod 400 has a tail end 4015 whose outer periphery is provided with an external thread, and the external thread of the tail end 4015 and the internal thread on the inner periphery of the bolt member 731 threadedly engage.

FIG. 23 is a diagram showing another example of the wire rod retaining portion of FIG. 22B. The wire rod 400 may be formed of carbon fiber reinforced resin, for example, and a part in which the external thread of the tail end 4015 is provided may be reinforced by being formed so as to be thick.

While a person skilled in the art may be able to conceive of additional effects or various modifications of the present invention based on the description given above, embodiments of the present invention are not limited to the embodiments described above and presented by way of example. Various additions, changes, and partial elimination may be made without departing from the conceptual idea and spirit of the present invention which are derived from the subject matter recited in the claims and its equivalents.

The invention claimed is:

1. A robot hand that comprises two or more finger portions making contact with a physical object and grips the physical object between the finger portions,
   wherein a gripping direction is nearly orthogonal to an extension direction of the finger portion and an outer shape of at least one phalanx portion is formed of a wire rod group configured with a plurality of loop-like wire rods having elasticity and arranged at predetermined intervals, and
   wherein, in the wire rod group, the wire rods are arranged such that a loop shape extends in the extension direction of the finger portion and have an opening, which extends in the extension direction of the finger portion, between the wire rods.

2. The robot hand according to claim 1,
   wherein the wire rod has a shape like a letter C or a shape like a letter U.

3. The robot hand according to claim 1,
   wherein a displacement sensor is provided in the wire rod group.

4. A robot comprising:
the robot hand according to claim 1.

5. A robot that comprises at least a torso portion and is able to move,
wherein the torso portion comprises a backbone member and an outer shape of the torso portion is formed of a plurality of loop-like wire rods having elasticity and provided in a prescribed manner so as to surround the backbone member,
wherein the loop-like wire rods surrounding the left side of the backbone member are not the same wire rods surrounding the right side of the backbone member, and
wherein each of the wire rods has a C-shaped configuration extending in the cross-sectional direction of the backbone member, which includes two ends being fixed to the backbone member and a tip formed by being bent between the two ends, and the tip is being free.

6. The robot according to claim 5, comprising:
a head portion,
wherein an outer shape of the head portion is formed of a loop-like wire rod having elasticity.

7. The robot according to claim 5,
wherein a displacement sensor is provided in the wire rod.

8. A robot that comprises at least a torso portion and is able to move,
wherein the torso portion comprises a backbone member and an outer shape of the torso portion is formed of a loop-like wire rod having elasticity and provided in a prescribed manner so as to surround the backbone member,
wherein the robot comprising:
an upper limb portion having a forearm portion and an upper arm portion; and
a lower limb portion having a thigh portion and a lower leg portion,
wherein each of the forearm portion, the upper arm portion, the thigh portion and the lower leg portion has a bone member and an outer shapes of each of the forearm portion, the upper arm portion, the thigh portion and the lower leg portion is formed of a plurality of loop-like wire rods surrounding the bone member, and each of the loop-like wire rod having elasticity and,
wherein each of the loop-like wire rods in at least one of the forearm portion, the upper arm portion, the thigh portion and the lower leg portion is arranged in the loop shape along the extending direction of the bone member wherein the one of the forearm portion, the upper arm portion, the thigh portion and the lower leg portion that is formed in the loop shape is defined as a selected loop portion, and
wherein each of the loop-like wire rods in the selected loop portion includes two ends and a tip formed by being bent between the two ends, and the tip is being free.

9. The robot according to claim 8, comprising:
a head portion,
wherein an outer shape of the head portion is formed of a loop-like wire rod having elasticity.

10. The robot according to claim 8,
wherein a displacement sensor is provided in the wire rod.

* * * * *